United States Patent
Preston

(10) Patent No.: US 6,446,081 B1
(45) Date of Patent: Sep. 3, 2002

(54) DATA INPUT AND RETRIEVAL APPARATUS

(75) Inventor: Keith Robert Preston, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/242,064

(22) PCT Filed: Dec. 16, 1998

(86) PCT No.: PCT/GB98/03774

§ 371 (c)(1),
(2), (4) Date: Feb. 8, 1999

(87) PCT Pub. No.: WO99/31604

PCT Pub. Date: Jun. 24, 1999

(30) Foreign Application Priority Data

Dec. 17, 1997 (GB) .............................................. 9726654

(51) Int. Cl.[7] .............................. G06F 17/00; G06F 7/00
(52) U.S. Cl. ......................................... 707/104.1; 704/9
(58) Field of Search ............................ 704/3, 7, 9, 10; 345/967, 968, 835, 839, 776, 775, 104.1; 707/520, 529, 3; 706/45–46, 55

(56) References Cited

U.S. PATENT DOCUMENTS

| 4,739,477 | A | * | 4/1988 | Barker et al. ............... 364/300 |
|---|---|---|---|---|
| 5,229,125 | A | * | 7/1993 | Parker et al. ........... 364/419.08 |
| 5,684,999 | A | * | 11/1997 | Okamoto ..................... 395/759 |
| 5,741,136 | A | * | 4/1998 | Kirksey et al. .............. 434/169 |
| 5,873,055 | A | * | 2/1999 | Okunishi ........................ 704/2 |
| 5,873,056 | A | * | 2/1999 | Liddy et al. .................... 704/9 |
| 5,953,693 | A | * | 9/1999 | Sakiyama et al. .............. 704/3 |
| 5,991,756 | A | * | 11/1999 | Wu ................................. 707/3 |
| 6,026,388 | A | * | 2/2000 | Liddy et al. .................... 707/1 |
| 6,178,422 | B1 | * | 1/2001 | Tada et al. ...................... 707/9 |

FOREIGN PATENT DOCUMENTS

EP         0387226        * 12/1990    ........... G06F/15/38

OTHER PUBLICATIONS

Masha Zager and Claire Chaise, "Using Microsoft Word 2$^{nd}$ Edition," Que Corporation, 1987, p. 298–299.*

* cited by examiner

*Primary Examiner*—John Breene
*Assistant Examiner*—Susan Rayyan
(74) *Attorney, Agent, or Firm*—Nixon & Vanderhye P.C.

(57) ABSTRACT

Input apparatus for a data processing system includes a processor, storage and graphical display in which a free-form source document is input and processed to parse a source document to locate semantically meaningful entities and to store corresponding content data. The graphical display is arranged to generate a visual representation of the source document in which the semantically meaningful entities are represented by pictorial elements.

41 Claims, 26 Drawing Sheets

To Fig. 24b

DATA INPUT AND RETRIEVAL APPARATUS

BACKGROUND OF THE INVENTION

This invention relates to method and apparatus for the input of data into computers and, in some embodiments, to subsequent retrieval thereof. Particularly but not exclusively, in one embodiment the invention relates to the input of data to, and data retrieval from, a database, and in another to the input of data defining a specification for a computer program.

1. Field of the Invention

The problem of providing communication between humans and computers has occupied those in the fields of computing hardware and software since the birth of computing. For decades, the goal has been to provide computers which can communicate with a human "naturally" by understanding free-form speech or text input. However, despite continued progress, this goal has not been reached yet.

Human-computer interaction is used for many things. For example, it is used to input immediate instructions for action by a computer (which is at present mainly provided by the combination of a cursor control device such as mouse and icons displayed on the screen, or by the use of menus). It is also used to input instructions for subsequent execution (which is mainly achieved at present by forcing human beings to use tightly constructed programming languages or descriptive languages which, despite their superficial resemblance to human languages, bear little relationship to way human beings actually communicate). Finally, it is used for data storage and retrieval (which is at present typically performed by storage of a textual document, and retrieval by searching for the occurrence of character strings within the document).

Those skilled in the art have approached this problem by the development of artificial intelligence techniques, with the aim either of providing a sufficiently comprehensive set of rules that a machine can eventually understand natural language input, or of providing a "self learning" machine capable of developing the same ability by repeated exposure to natural language.

SUMMARY OF THE INVENTION

In one aspect the present invention seeks to address the same technical problem, but from a different direction. In the present invention, an input document (which may be spoken or in text form, or indeed in any other form representative of natural language) is input to an input apparatus (which may be provided by a general purpose computer) and is analysed, to separate the meaningful concepts within the document and record these together their inter-relationship. The present invention has this in common with most attempted artificial intelligence systems.

For example, EP-A-0118187 discloses a natural language input system which is menu driven, allowing a user to select one word at a time from a menu, which prompts the next possible choices based on what has previously been input.

U.S. Pat. No. 5,677,835 discloses an authoring system in which documents to be translated are input and analysed, and where ambiguities are detected, the user is prompted to resolve them.

In this aspect of the invention, however, these meaningful entities (for example, the concepts described by nouns) are displayed on an output screen, in a graphical form, which represents them as separate icons and meaningfully indicates their interconnection or relationship.

This apparently simple step provides a number of benefits. The first is that it gives immediate feedback to the human inputting the data of the "understanding" gained by the computer. Natural human language is full of ambiguities which, normally, human beings are readily able to resolve without conscious thought because of their shared knowledge base, which are at best ambiguous and, at worst, mis-recognised by a computer.

To take an English example, "Mary was kissed by the lake" is ambiguous, since it can be interpreted either as indicating that the lake is the active party (the kisser) or that the lake is the location at which Mary is kissed by an (unknown) active party.

Whereas a human immediately understands the correct meaning, and may not even see the presence of an ambiguity, a computer is unable to do so unless programmed by a rule or conditioned by experience.

By displaying the construction understood graphically, however, the present invention enables the avoidance of such ambiguities which are immediately recognisable to the user.

Very preferably, the invention provides a graphical user interface to enable the user to manipulate the graphical display, and means to interpret the results of such manipulation. Indeed, it would in principle be possible to allow the user to directly input the document graphically without previous direct document input (although this is not preferred, for reasons of speed, for most applications).

Thus, the user is able to allow the computer to extract as much meaning as possible from the input document and then to correct the ambiguities or errors graphically.

The invention will be understood to differ from so called "visual programming" systems, as described, for example, in EP-A-0473414. Such visual programming systems provide a graphic environment in which operations to be specified are represented visually, and a user may specify a sequence of such operations by editing the display to create and alter linkages between the elements. However, in visual programming, as in other known methods of creating or specifying programs, the user is constrained to select from a limited number of predefined operations and connections therebetween. By contrast, the present invention accepts documents as input and analyses the documents to provide the graphical display which may subsequently be edited.

The resulting semantic structures, corresponding to the graphical representation (corrected where necessary), are stored for subsequent processing or retrieval. In one embodiment, data retrieval apparatus is provided. In another embodiment, the stored data is employed by a code generator, to generate a computer program.

The invention is advantageously used for this latter application, because the detection of ambiguities eliminates one of the difficulties in existing software specification and automatic code generation from such specifications.

In either case, in the preferred embodiment there is a stored lexical table which stores data relating to the meanings of words which will be encountered in the source document (analogously to an entry in an well structured dictionary).

Preferably, in this case, the apparatus is arranged to perform "reasoning" utilising this semantic information, by comparing the meanings of groups of words (i.e. clauses or sentences) of the document to locate inconsistencies, or by performing the same operation between multiple different documents.

This is particularly advantageous in embodiments where the source document is to act as a specification for the generation of computer code, because it enables the location of conflicting requirements.

Since the present invention, in this embodiment, has some "understanding" of the "meaning" of words, it is able to store the content data (for example in the form of semantic structures representing groups of words such as clauses or sentences) by reference to such "dictionary entries"—i.e. by reference to their "meaning", rather than the source language word which was input. This makes it possible to use a multilingual embodiment of the present invention, where the lexical entries are mapped onto corresponding words in each of a plurality of languages, so that data may be input in one language and output in one or multiple different languages.

In embodiments for data retrieval, or similar applications, each such lexical entry may have an associated code indicating the "difficulty", "obscurity" or "unfamiliarity" of the concept described. For example, concepts may be labelled as familiar to children upwards; familiar to adults; or familiar only to particular specialists such as physicists, chemists, biologists, or lawyers.

With knowledge of the level of familiarity of the data retriever, the present invention is in this embodiment able to utilise such ratings to output data appropriate to the understanding of the retriever so as not to output information which is too facile for an advanced user, or too complex for a casual user.

Different semantic elements may be associated, explicitly or implicitly, with an access level rating. Thus, for example, classified items may be available for access only to properly identified users; "adult only" items may be classified as unavailable to identified children; and proper names may under some circumstances be suppressed (for example, the name of parties to litigation).

By associating a classification with each item, rather than with documents or materials as a whole, a much finer-grained control of information is obtained.

In data retrieval embodiments, the data retrieval apparatus preferably comprises a natural language generator, for generating a document from semantic structures produced as described above. This has several advantages over the mere supply of corresponding portions of the original document.

Firstly, as described above, it provides the possibility of a multilingual embodiments since different generators may, from the same semantic structure, generate text in different languages.

Secondly, where access codes are employed as described above, the generator may in preferred embodiments be able to re-generate readable text from a reduced amount of information (for example, by using the passive voice where a name is suppressed, rather than the active voice). This aspect of the invention is also useful separately of the data input methods above.

The input and/or output according to various embodiments of the invention may be in the form of speech, text or animated video, in which case the input and/or output apparatus comprises, as appropriate, speech recognisers and/or synthesisers; text input and output; and image pick up and analysis/video generation apparatus.

BRIEF DESCRIPTION OF THE DRAWINGS

Other aspects and preferred embodiments are as described in the following description and claims.

Embodiments of the invention will now be illustrated, by way of example only, with reference to the accompanying drawings, in which:

FIGS. 11a and 11b are diagrams showing the display produced by the first embodiment from the data stored in a lexical database forming part of FIG. 9a;

FIG. 13 is a block diagram illustrating the hierarchical arrangement of data stored within the lexical database forming part of FIG. 9a;

DETAILED DESCRIPTION OF EXEMPLARY EMBODIMENTS

First Embodiment

A first embodiment of the invention is an Internet-based information storage and retrieval system.

Figure 1:
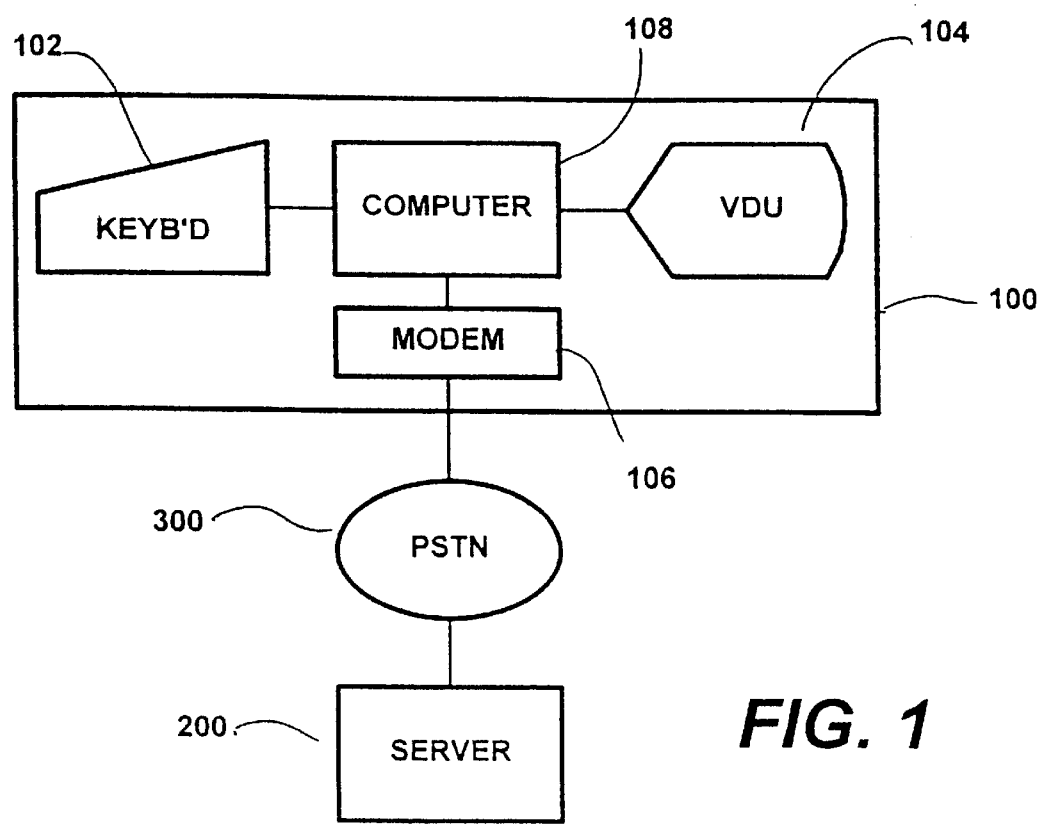
FIG. 1 is a block diagram of apparatus according to a first embodiment.

Referring to FIG. 1, the present invention may be provided by a client terminal 100a connected via a telecommunications network 300 such as the Public Switched Telephone Network (PSTN) to a server computer 200. The terms "client" and "server" in this embodiment are illustrative but not limiting to any particular architecture or functionality.

The client terminal comprises a keyboard 102, a VDU 104, a modem 106, and a computer 108 comprising a processor, mass storage such as a hard disk drive, and working storage, such as RAM. For example, a SUN™ work station or a Pentium™ based personal computer may be employed as the client terminal 100a.

Figure 2:
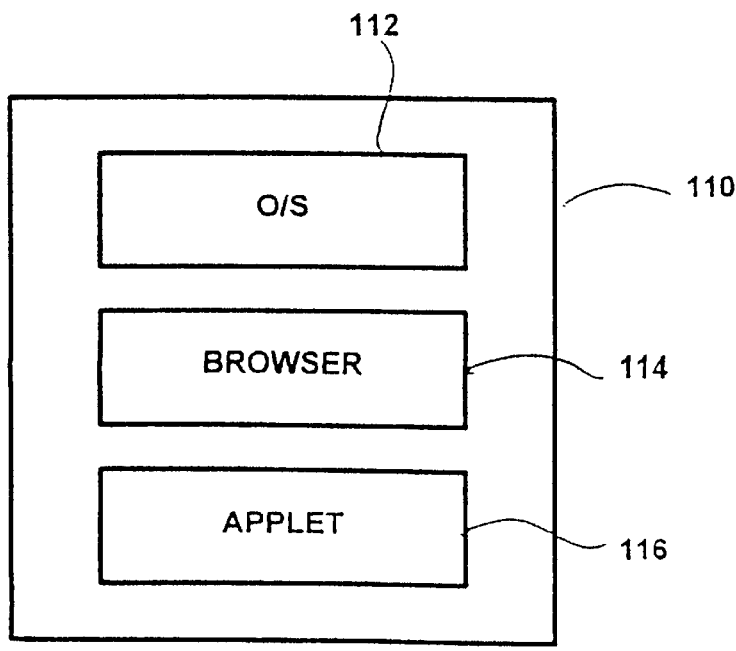
FIG. 2 is a block diagram showing in greater detail the processes present in a client terminal forming part of the embodiment of FIG. 1.

Referring to FIG. 2, stored within the client terminal (e.g. on the hard disk drive thereof) is an operating control program 110 comprising an operating system 112 (such as Windows™), a browser 114 (such as Windows Explorer ™ Version 3) and an application 116 (such as a Java™ applet), designed to operate with the browser 114. The function of the operating system 112 is conventional and will not be described further. The function of the browser 114 is to interact, in known fashion, with hypertext information received from the server 200 via the PSTN 300 and modem 106. The browser 114 thereby downloads the applet 116 at the beginning of the communications session, as part of a hypertext document from the server 200.

The function of the applet 116 is to control the display of received information, and to allow the input of information for uploading to the server 200 by the user, through the browser 114.

In this embodiment, which concerns data input and access, the applet 116 comprises two separate applets 116a, 116b; a first 116a for data input and a second 116b for data retrieval.

Figure 3:
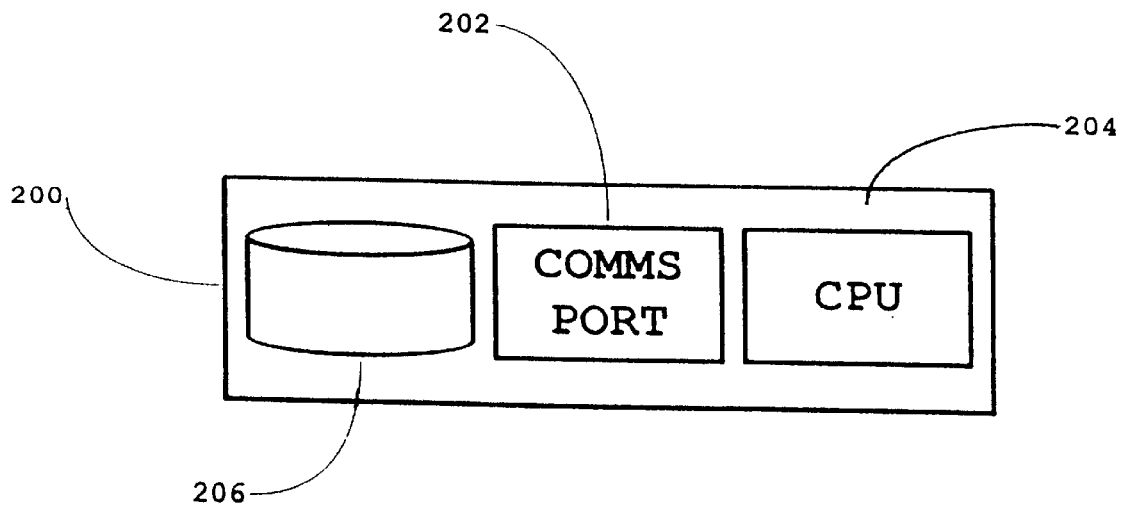
FIG. 3 is a block diagram showing in greater detail the processes present in a server forming part of the embodiment of FIG. 1.

Referring to FIG. 3, the server 200 comprises a communications port 202 (e.g. a modem); a central processing unit 204 (e.g. a mainframe computer) and a mass storage device 206 (e.g. a hard disk drive or an array of disk drives).

Figure 4:
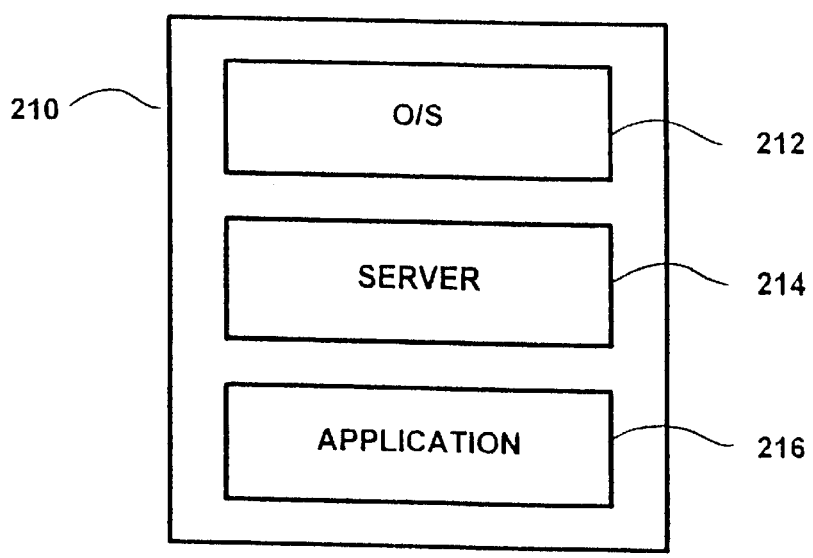
FIG. 4 is a block diagram showing in greater detail the processes present in the server of FIG. 3.

Referring to FIG. 4, the server 200 comprises an operating program 210 comprising an operating system 212 such as Unix™, a server program 214 and an application program 216. The operating system is conventional and will not be described further.

The function of the server program 214 is to receive requests for hypertext documents from the client terminal 100a and to supply hypertext documents in reply. Specifically, the server program 214 initially downloads a document containing the applet 116 for the client terminal 100a. The server program 214 is also arranged to supply data to and receive data from the application program 216, via, for example, a cgi.bin mechanism or Java Remote Method Invocation (RMI) mechanism. The application program 216 comprises a first application 216a for data input and a second application 216b for data retrieval. Each receives data from a client terminal 100, performs processing, and returns data to that client terminal for display.

Data Input

Overview

Figure 6A:
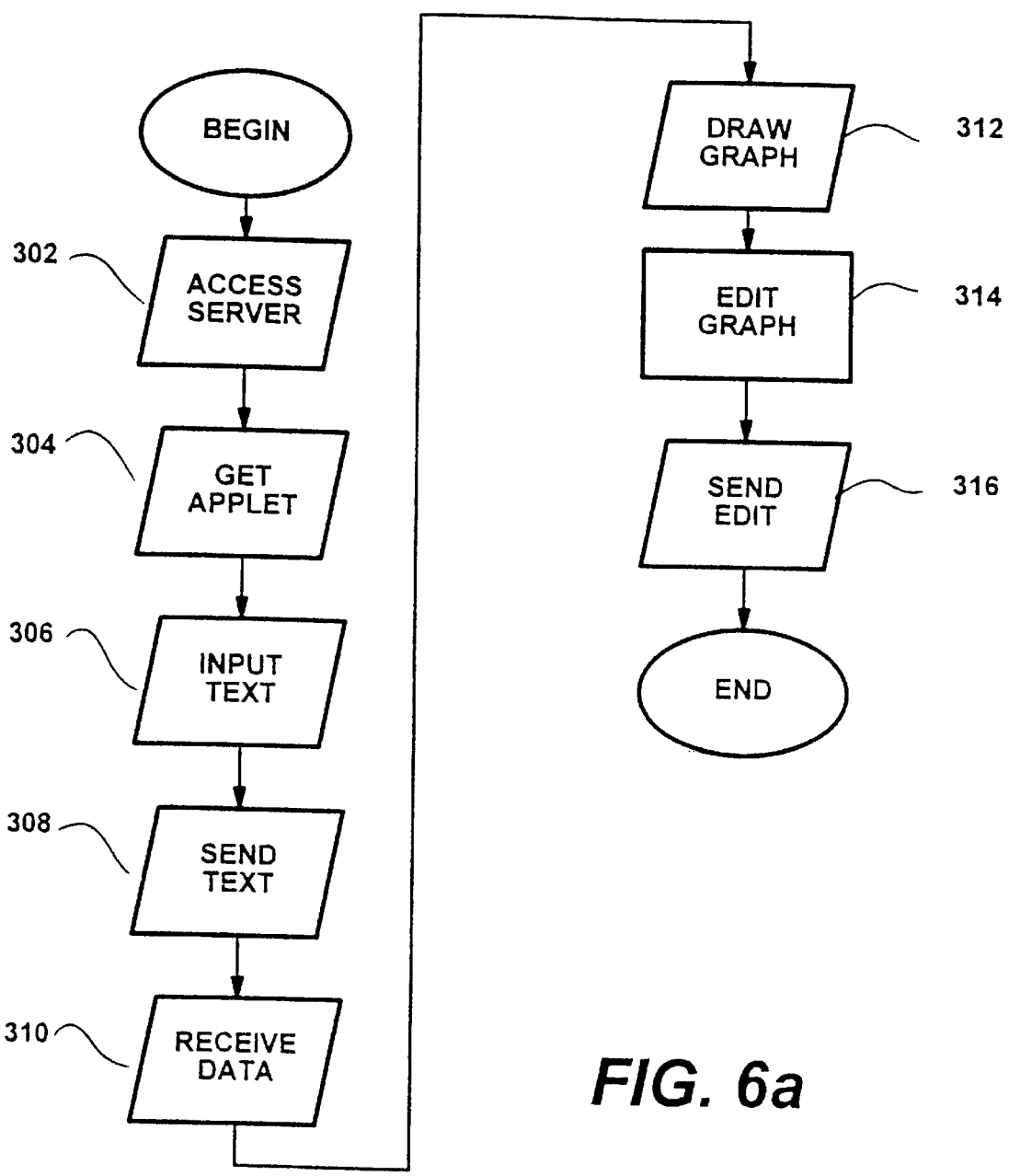
FIG. 6a is a flow diagram showing the process of data input according to the first embodiment performed by the terminal of FIG. 1.
Figure 6B:
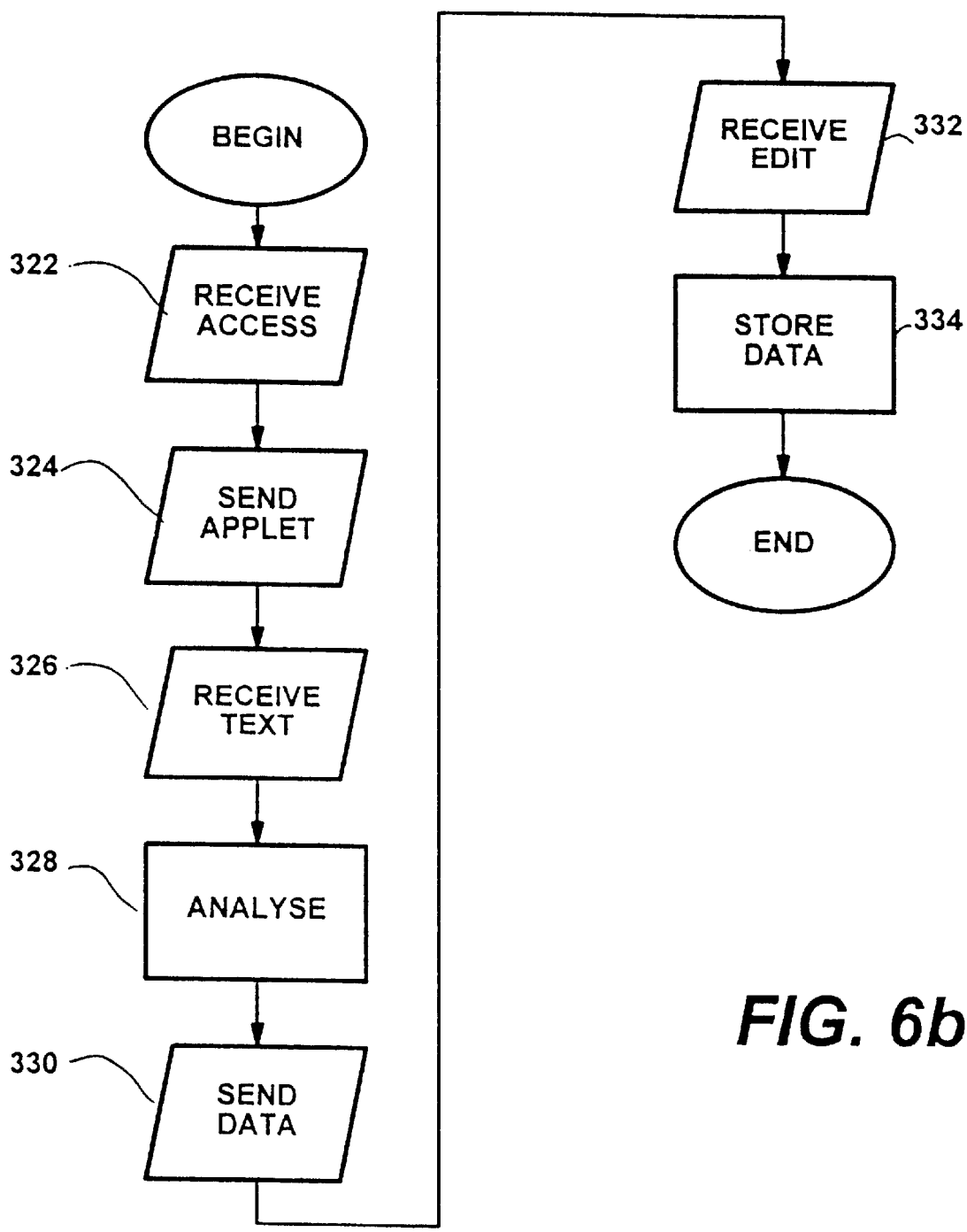
FIG. 6b is a flow diagram showing the process of data input performed by the server of FIG. 1.

Referring to FIGS. 6a and 6b, an overview of the operation of data input will now be given.

On a signal from the user to initial data input (e.g. by selecting an icon on the terminal 100), in step 302, the browser 114 accesses the server 200 via the PSTN 300 in conventional manner.

In step 322, the server 200 receives the access request, which is passed via the operating system 212 to the server program 214 and thence to the application 216 for handling. The application 216 retrieves a copy of the applet 116 from the store 206, and transmits it via the PSTN 300 to the terminal 100 in step 324.

In step 304, the terminal 100 receives the applet 116 and the browser 114 loads the applet 116 into memory and causes it to execute.

Figure 5A:
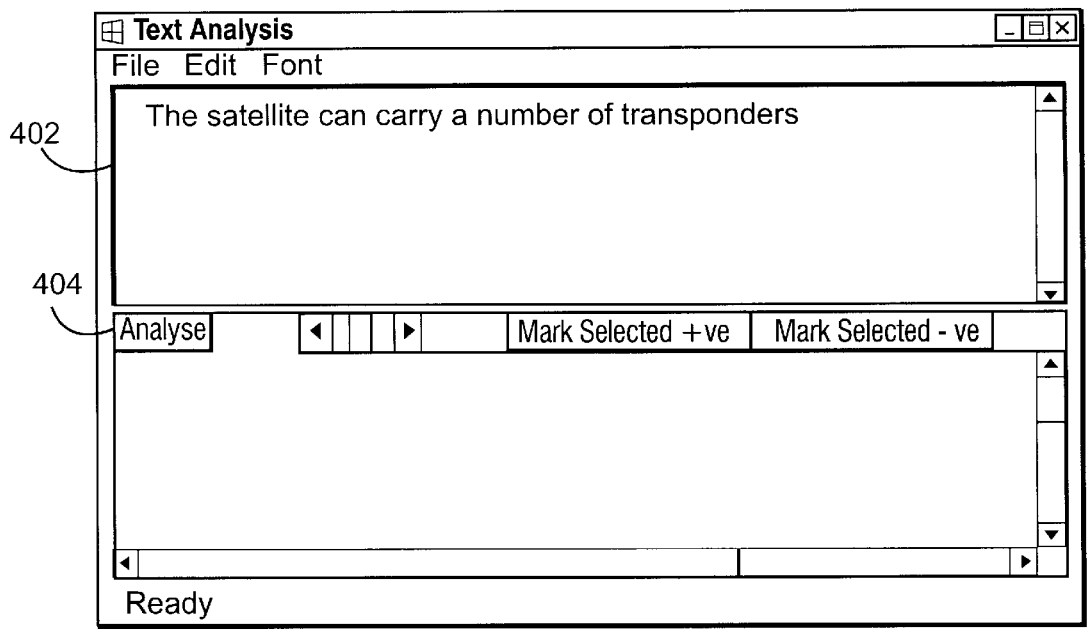
FIGS. 5a and 5b are illustrations of output displays produced according to the first embodiment.

Referring to FIG. 5a, the applet then displays a data entry screen comprising a text entry window 402.

In step 306, the applet 116a then allows text to be typed in to the display area 402 and buffered locally within the terminal 100.

On a signal by the user to commence analysis (e.g. by selecting the button 404 with the input device 102), the applet 116 sends the text which is displayed within the text entry box 402 to the service 200.

In step 326, the service 200 receives the text, which is passed to the application 216. In step 328, the application 216 performs a semantic analysis upon the text, as will be described in greater detail below, to locate and identify within the text the following elements:

a) meaningful semantic entities, typically denoted by nouns. For example, in the example shown, the semantic entities are "satellite", "number" and "transponders".

b) the form of each of the entities (e.g. whether it is singular or plural), and whether it is in the definite or indefinite form. In the example shown in FIG. 4a, "the satellite" is singular, and "the" indicates that it is the definite article. "Number" is singular, and "a" indicates that it is in the indefinite form. "Transponders" is in the plural form, and the lack of determiner after "of" indicates that it is in the indefinite form.

c) "States of affairs"—generally indicated by verbs. States of affairs indicate either actions, as most verbs do, or states of being (e.g. the verb "to be"). In this example, "carry" and "can" are states of affairs.

d) The conditions attached to each state of affairs (e.g. the tense of the verb concerned).

e) Modifiers (e.g. adverbs or adjectives) which ascribe properties or otherwise modify an entity or state of affairs.

f) The linkages between the occurrences of the foregoing (e.g. which entities a state of affairs affects and how; and which entities or state of affairs a modifier modifies).

Each detected state of affairs, entity or modifier is represented by a stored entry (to be described in greater detail) in the store 206.

The application 216 then generates display control data for transmission to the terminal 100, comprising a list or string of records each corresponding to a recognised entity, state or affairs or modifier, and contain the name of the object (i.e. text to be displayed) which indicates the item recognised (e.g. the word which was typed in, such as "satellite" or "carry"), together with pointer data indicating the semantic connections therebetween, and data indicating the form thereof (e.g, as discussed above, singular or plural etc.).

This data is transmitted in step 330 to the terminal 100 and received thereat at step 310; on reception, it is passed to the applet 116a which stores it. Conveniently, the applet 116a is an object-oriented program, arranged to store class data relating to a state of affairs class; a modifier class; and an entity class, and the data comprises a set of records each of which is interpreted as an object instantiating a respective one of the classes. Associated with each of the classes is drawing code, enabling the applet 116 to cause the corresponding object to be drawn.

Figure 7:
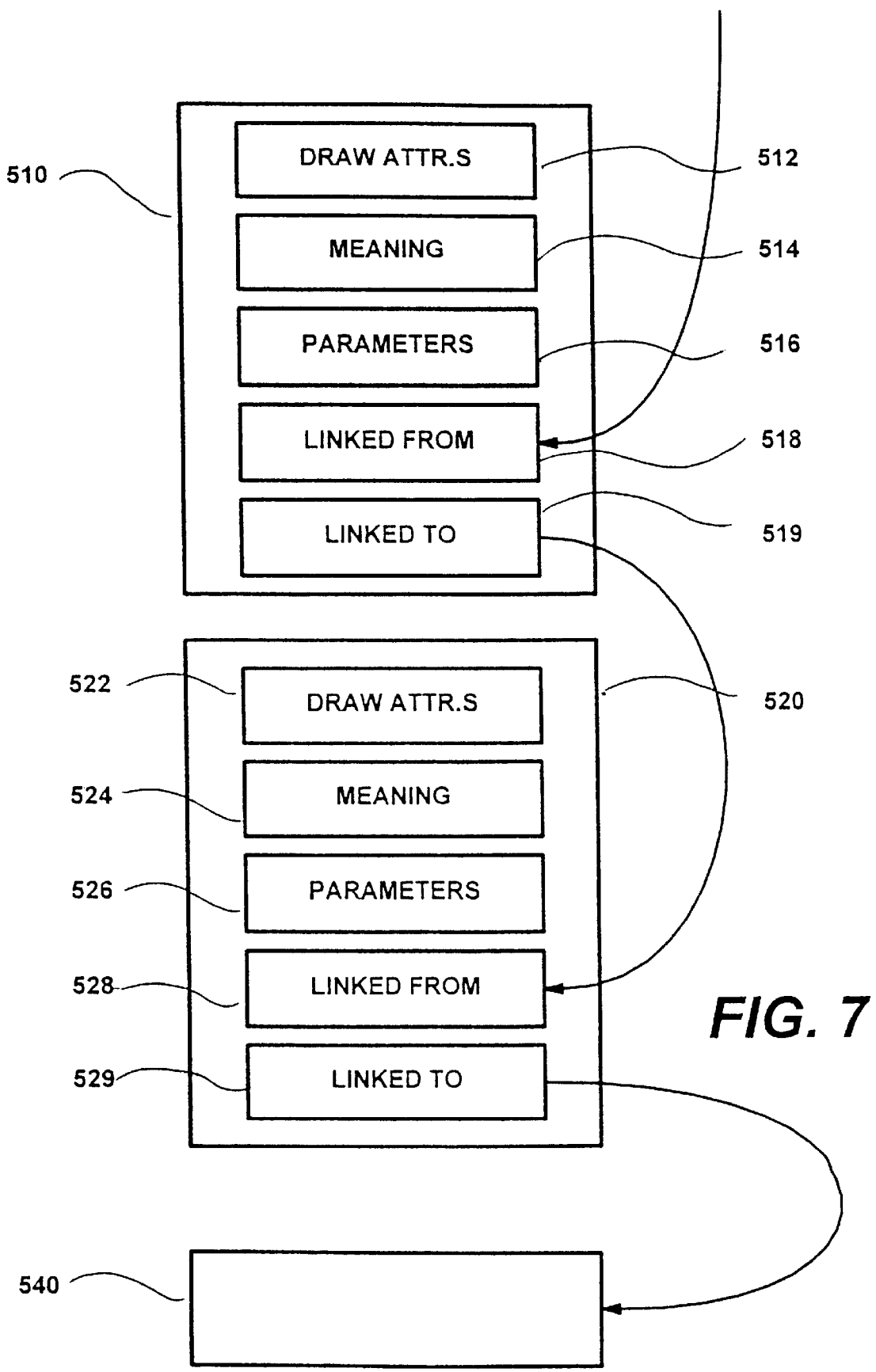
FIG. 7 is a diagram illustrating the data stored in the terminal of the FIG. 1.

FIG. 7 shows the form in which three such objects 510, 520 . . . , 540 are stored; each comprises a field (512, 522) for draw attributes (such as position and size) used to draw the object; a field 524 storing the meaning (e.g. a word representing the noun, vowel or modifier the object shows); a field (516,526) storing the parameters of the semantic entity the object represents (e.g. whether it is single or plural and so on); and a pair of pointer fields (518,519; 528,529) storing, respectively, pointers to one or more objects to which the object is linked, and to one or more objects from which the object is linked. From these pointer fields, the interconnection between objects is derived, and graphically represented as shown in FIG. 5b.

Figure 5B:
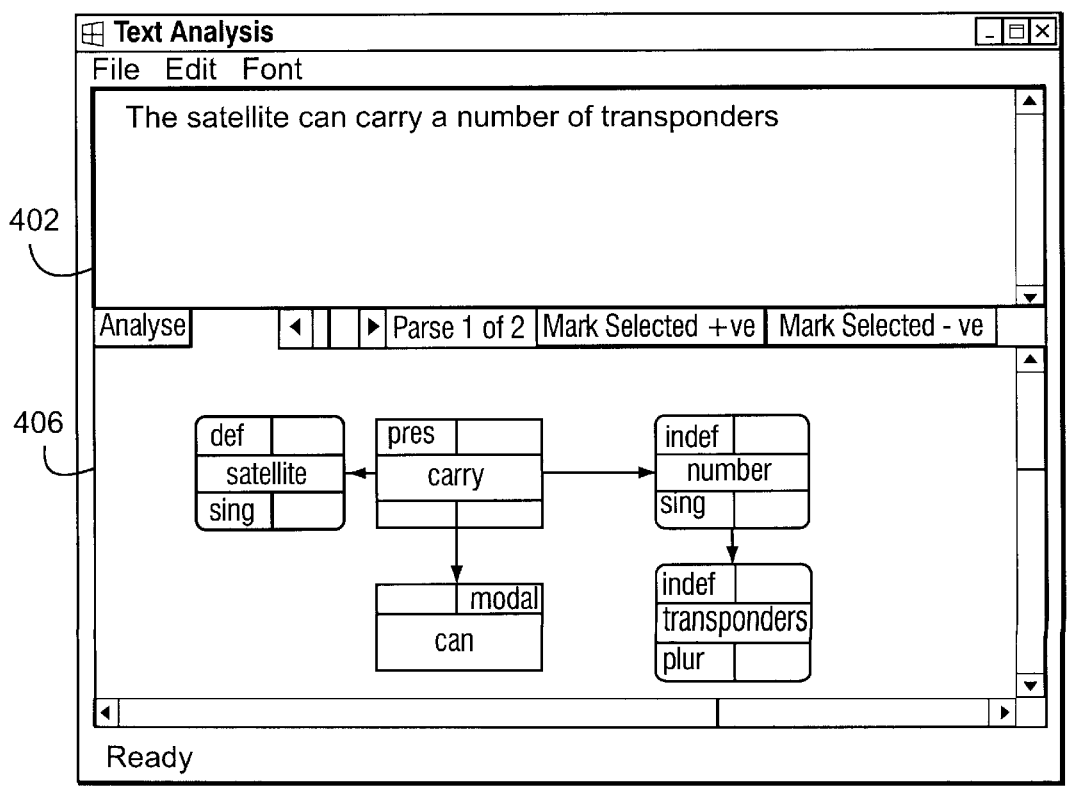

Referring to FIG. 5b, an analysis display area 406 is provided, in which the applet program 116a draws each of the objects received from the server 200, represented by a shape (which is visually different for entities, modifiers and states of affairs, for example by being a different shape and/or a different colour) and, within each, represents the name of that object (which generally corresponds to the text which was input). Additionally, the applet 116a draws graphical linkages (shown as arrowed lines) indicating the semantic connections between the objects, using the pointer data within each object, and a drawing program for drawing an arrowed line to represent the pointer data.

The result is, as shown in FIG. 5b, that the results of the text analysis performed by the application 216 are shown graphically, for inspection by the user, in a form which enables immediate recognition of any misunderstanding by the analysis program.

Upon display of the semantic graph display data within the display window 406, the applet 116a is operable to allow the user to edit the graphical display, specifically by "selecting" linking pointer representations (e.g. using a mouse) and deleting them (e.g. by operating a "delete" key on the keyboard 102); and to add new pointers (e.g. by "selecting" a first displayed object; moving the displayed cursor to a second; and indicating that a link is to be formed by operation of the mouse or keyboard 102).

Thus, where an incorrect relationship between displayed objects has been understood by the application 216, the user may re-draw the graph to represent the correct relationship. The applet 116 is arranged to edit the pointer data (528, 529;518,519) held within each locally stored semantic object, to update changed linkages.

Provision is also preferably made to enable the deletion of displayed objects where the user wishes to do so.

Additionally, it is preferred that the applet 116a provides conventional graphical user interface options for moving displayed objects and/or re-sizing displayed objects; in this case, the applet 116a alters the values of locally stored display attributes (512;522) of each object.

On finishing the editing step 314 thus described, the user indicates that the edit is complete (e.g. by operating a key on the keyboard 102) and, in response thereto, the applet 116a sends the edited object data (not including display attribute data (512;522) discussed above) to the server 200 in step 316.

In step 332, the server 200 receives the edited data, and stores the data in the store 206 in step 334.

Analysis Process

Further details of the operation of the application 216 in performing the analysis step 328 will now be described.

Figure 8:
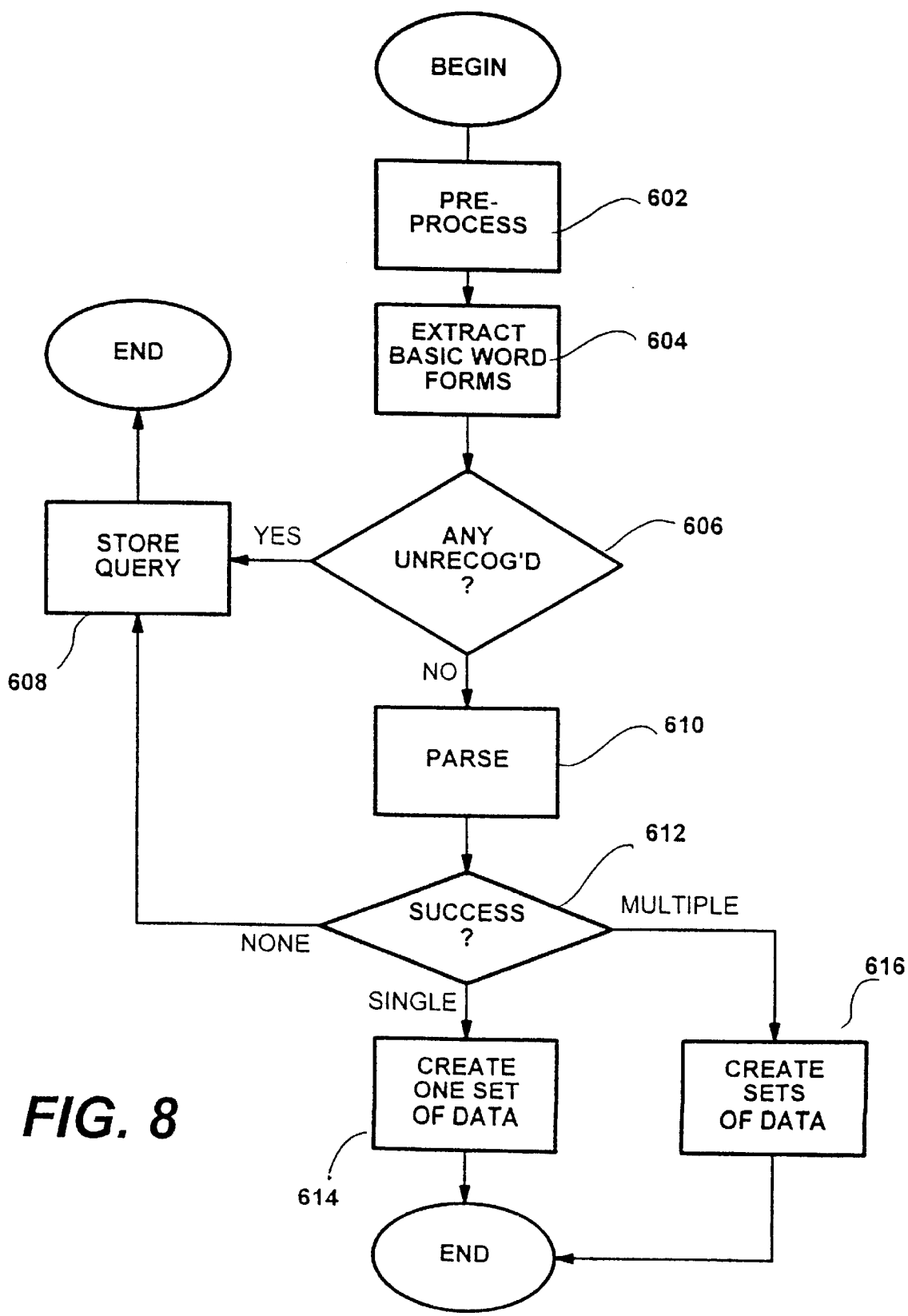
FIG. 8 is a flow diagram showing the process of text analysis performed by the server of FIG. 1.
Figure 9A:
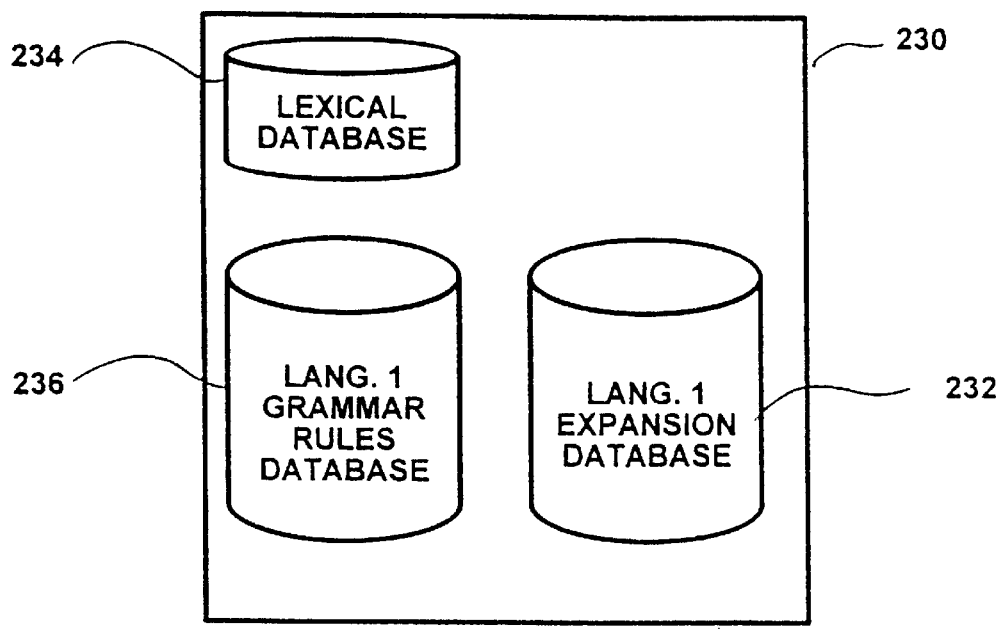
FIG. 9a is a block diagram showing the stored data used for the analysis of FIG. 8.
Figure 9B:
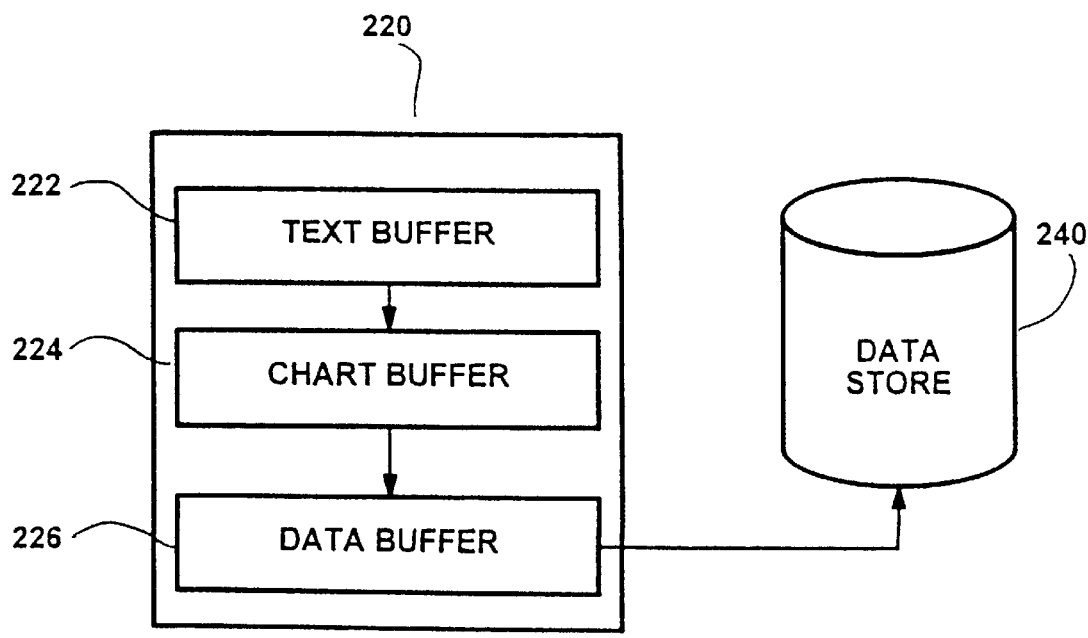
FIG. 9b shows the storage of data generated by the analysis of FIG. 8.

In a step 602 of FIG. 8, the text received from the terminal 100 is pre-processed, to detect the beginnings and ends of words (by the presence of a space); the presence of punctuation; the presence of capital letters (indicating either a proper name or the beginning of a sentence); and the presence of numeric or other special characters. The pre-processed text, in which words, numbers, and so on are separated and flagged is stored in a text buffer 222 within working memory 220 provided within the store 206 as shown in FIG. 9b.

If one or more entries are found, corresponding to different meanings, entries for each meaning are stored (as alternatives), with a pointer to the relevant lexical table entry.

Next, in step 604, an expansions database 232 provided within fixed memory (e.g. a disc drive) 230 within the store 206, is used to map the expanded form of the word onto its root form. For example, plural, masculine or feminine forms of a word are detected, and replaced by the root form of the word and a flag indicating the relevant expansion (e.g. the sex, tense or other form). The result is stored in the text buffer 222.

Next, in step 606, each word is looked up in a lexical database 234 (to be described in greater detail). If no entry is found in the word for the lexical database for a word, then in step 608, a query as to the meaning of the word is stored for later use.

Next, in step 610, a set of stored grammar rules held in a grammar rules database 236 is accessed, and in accordance with the grammar rules, the words held in the text buffer are parsed. Our earlier application number PCT 97186887.6, filed on Aug. 8, 1997 (and corresponding PCT application PCT/GB98/02389 filed on Aug. 7, 1998), discloses details of one method of parsing which may be employed herein and is incorporated herein by reference in its entirety. Further information on suitable parsing techniques which may be used will be found in James Allen, "Natural Language Understanding", Second Edition, Benjamin Cummings Publications Inc, 1995.

Briefly, each of the separately stored elements within the text buffer (i.e. each corresponding to the root form of a word, or a number, or other semantic entity) is processed, to apply the grammar rules within the grammar rules database to the word.

The rules specify the manner in which words can be connected grammatically in the language concerned, and thus, for example, where the word is a noun, a rule may specify that it should be preceded by a definite or indefinite article.

Accordingly, for each word, the other words in the text buffer are reviewed to determine whether they can be combined with that word, according to the grammar rules, to produce a grammatically correct structure. For each possible substructure thus produced, the grammatical rules are then applied again, to combine the substructure with other words or substructures. In this way, as shown in FIG. 10, a chart structure in which the original words are related by syntactic connections is assembled.

Figure 10:
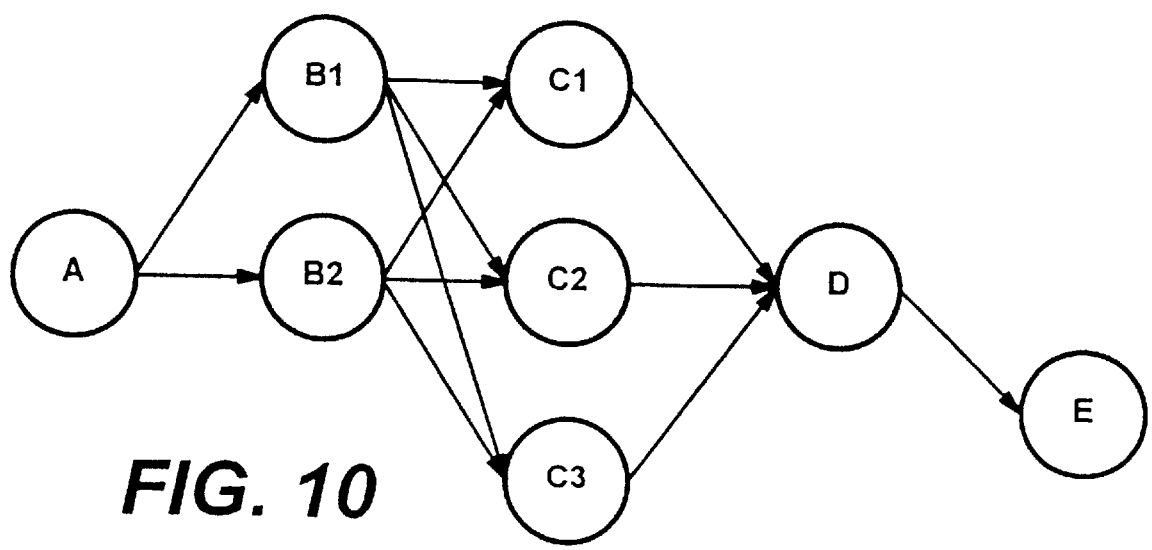
FIG. 10 is a diagram illustrating the results of the analysis of FIG. 8.

Some possible substructures thus temporarily created will be rejected, because it is not possible to combine them with the remaining words and substructures to produce an entire grammatically correct sentence or phrase (represented by a single path through the nodes of the chart shown in FIG. 10).

In step 612, it is determined whether no such single parse is generated, and if so a query is generated at step 608, as described below.

If a single successful parse is extracted (corresponding to a single, unambiguous, meaning of the input text) then in step 614 a single set of output data are generated as a message for transmission to the terminal 100.

As already described, the data comprises a list of the word meanings detected, together with the parameter data indicating the form of the words and the form of the context in which they occur (i.e. whether the word is present as a single or plural item, definite or indefinite case), as determined by the application of the grammar rules, together with pointer data linking words which are modifiers, words which are states of affairs and words which are entities.

Where (step 612) more than one successful parse was completed, corresponding to two different meanings of the input text (caused either by an ambiguity in the sense of one of the words, such as the ambiguity in English between the word "bank" meaning the side of a river and the word "bank" meaning a financial institution; or an ambiguity in the semantic relationship between these words (such as, in English, the above quoted example of "Mary was kissed by the lake") then multiple separate sets of data are created, one for each of the parses, for transmission to the terminal 100.

Where such multiple sets of data are supplied, the applet 116a is arranged to display all such alternative constructions of the input document; for example, by displaying them sequentially as a user toggle through the meanings by selecting a key on the keyboard 102 or a display button on the screen (visible in FIG. 5b).

Query Handling

Where no parse is possible, either because one or more words are unrecognised (step 606) or because the words, whilst recognised, do not sufficiently obey the grammatical rules to permit parsing (step 612), a query is generated in step 608 as a message for transmission to the terminal 100.

In the case of an unrecognised word, the message may be such as to cause the applet 116a to display text such as:

"The following word was unrecognised. Please either re-enter the word if it was mis-spelt, or supply the following data:"

The message is presented as an editable form, in which the user of the terminal 100 can either enter a corrected version of the word for transmission, or substitute an alternative word, or supply sufficient information to create a new entry in the lexical database 234 and the expansion form database 232 for the word.

Such data will vary from language to language, but will include the gender (where relevant to the language), expansion form data for storage in the database 232, category (i.e. modifier, state of affairs or entity), and the meaning data discussed below, providing information on the meaning of the word.

As a preliminary step, the word may be checked using a (conventional) spell check operation, and where multiple close matches are found, each may be tested to determine whether it leads to a possible parse; where one of the possibilities uniquely leads to a possible parse, this may be selected, or alternatives may be transmitted back to the terminal 100 for selection of an appropriate one by the user.

Upon completion of the response by the user, either the amended word or the new definition is transmitted back to the host computer 200, and (after updating the expansion form database 232 and lexical database 234 if necessary) the process of FIG. 8 is repeated.

In the event that it was not possible to parse the input text, the query message may be in the form "the text input was . . . It was not possible to understand the meaning of this text. Please review the text, and modify it to clarify its meaning".

The original text may be presented by the applet 116a in an editable window, allowing the user to edit it either to correct any mistakes or to substitute alternative words for those used.

Lexical Database

Figure 13:
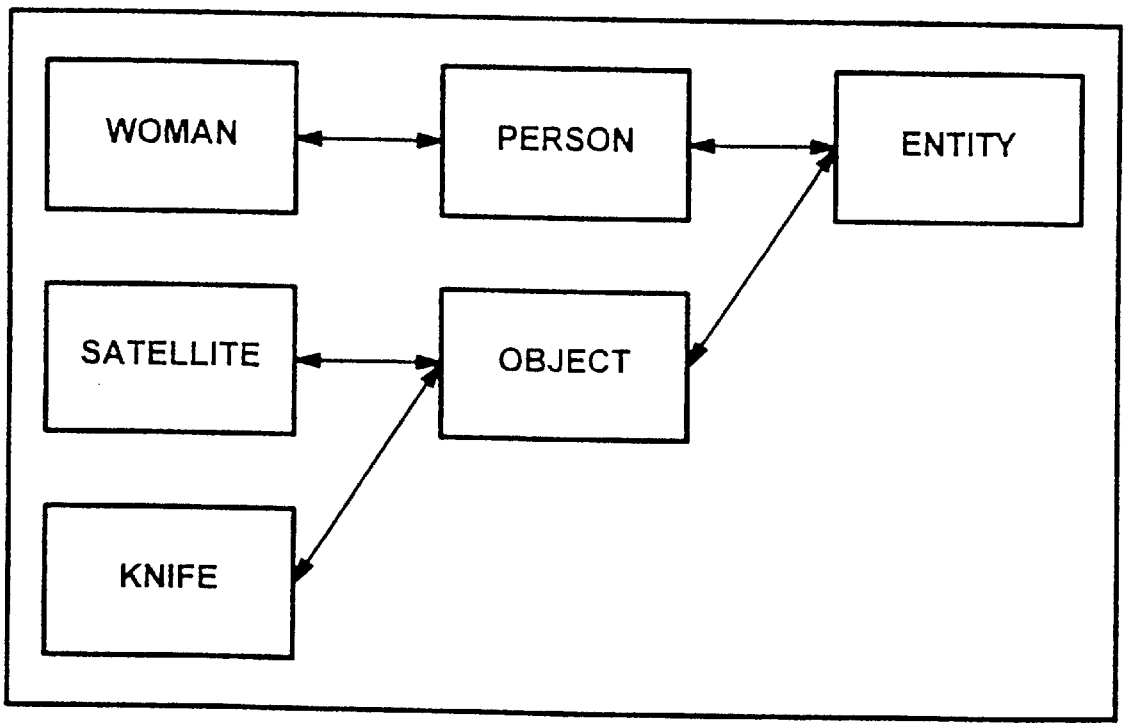

The lexical database 234 includes an entry for each meaning of each word in the language (or all languages), used by the system. Each entry for each meaning includes a definition of the meaning the word in the or each language. The entries are hierarchically ordered as shown in FIG. 13. The uppermost layer of the hierarchy consists of entries for the three categories of entities, states of affairs and modifiers. Each category is then further subdivided.

Figure 11A:
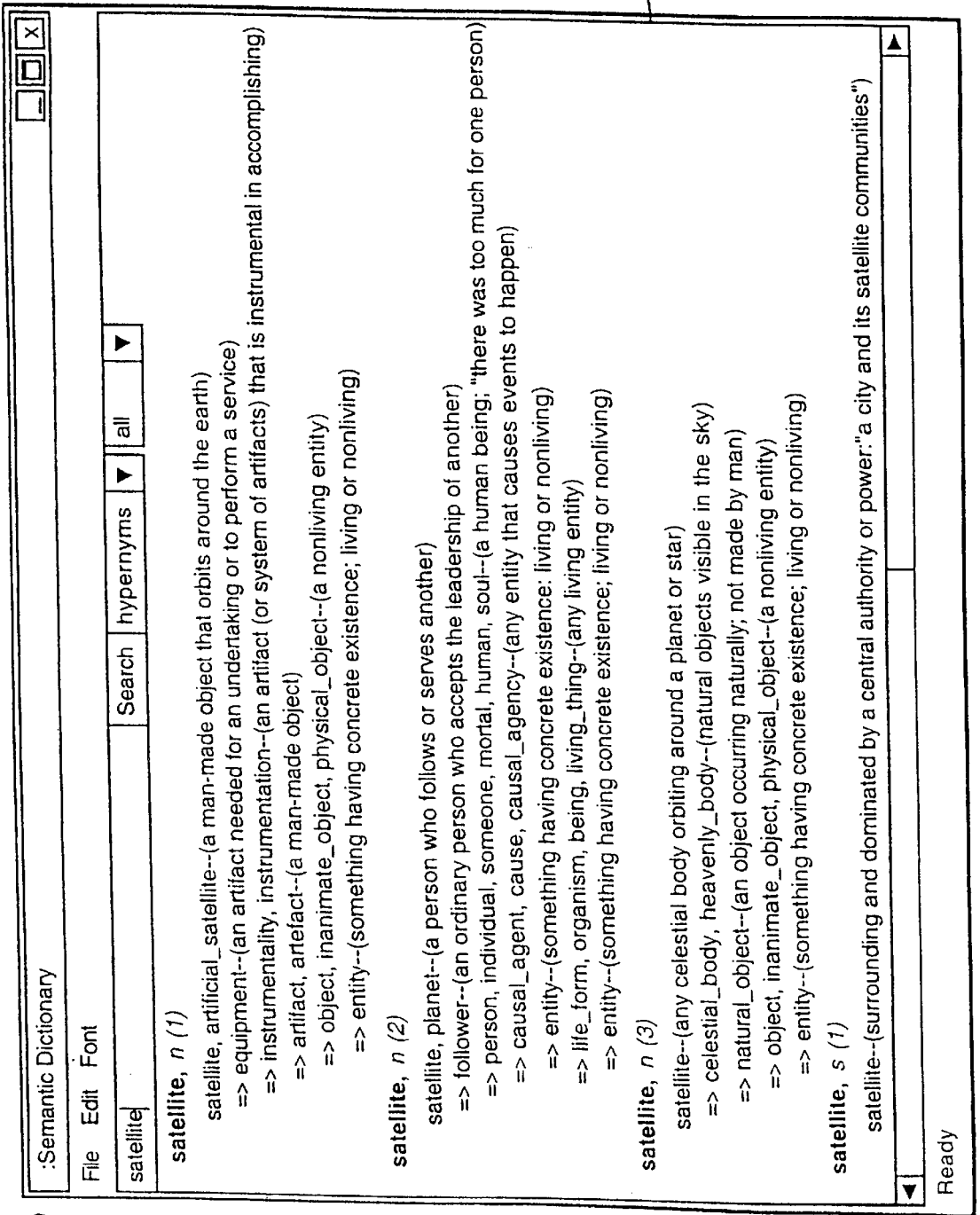
Figure 11B:
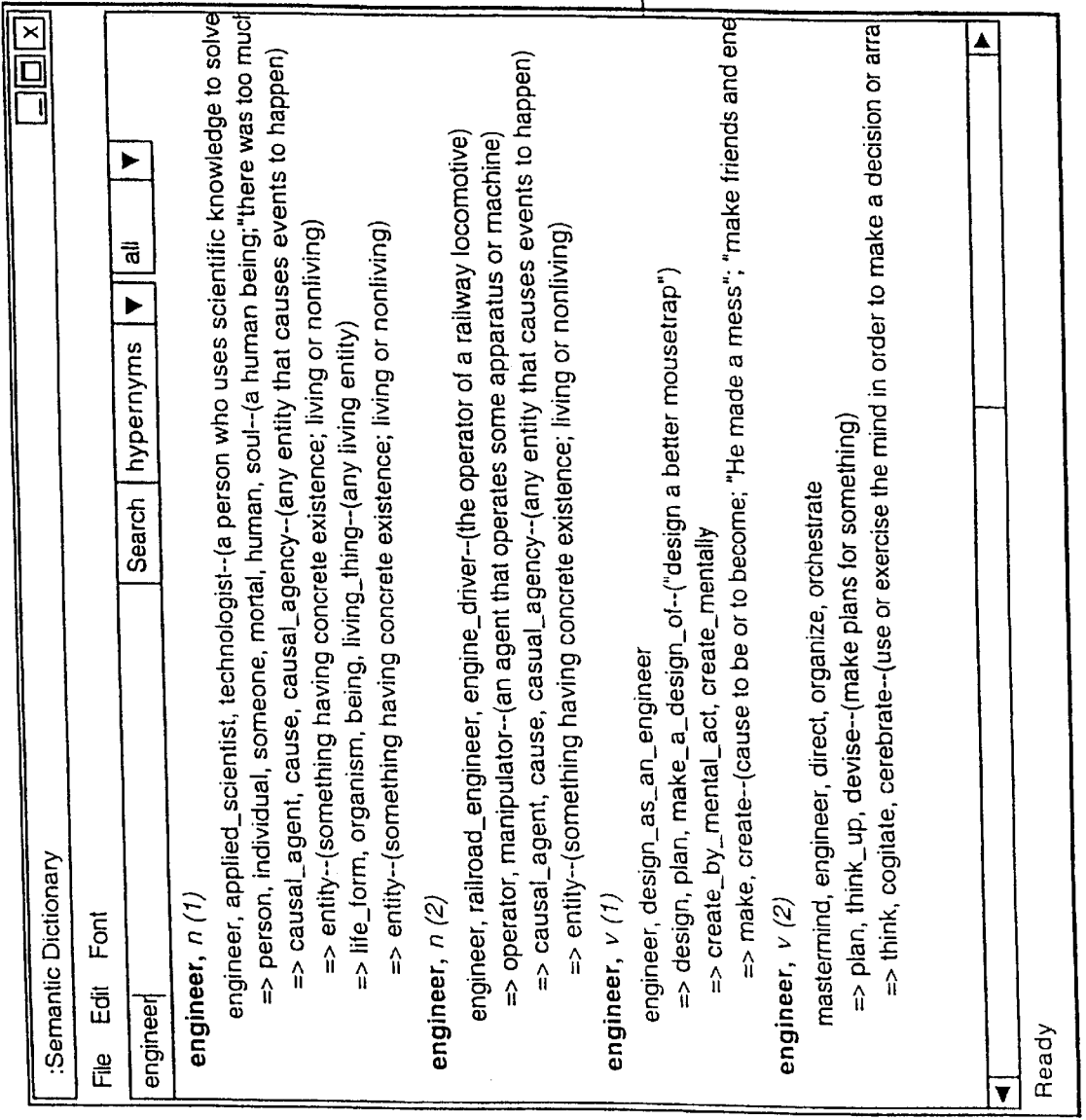

The applet 116a is arranged to be operable,(e.g. by selection of a key on the keyboard 102, or an area of the display) to allow the input of a word by the user via the keyboard 102 for transmission to the computer 200, and the applet 116a is arranged to receive in reply a document (for example in text or hypertext) from the computer 200 and to display it in a dictionary display area 410 shown in FIGS. 11a and 11b.

FIG. 11a illustrates the definition data, retrieved from the lexical database 234 and displayed in the dictionary display area 410, for the word "satellite". Entries in the database for the same word include data indicating the relative frequency of occurrence of the definition concerned, and the application 216 is arranged to format the different meanings into order by their frequency of occurrence.

As shown in FIG. 11a, the most commonly occurring meaning of satellite is an artificial satellite (a man-made object that orbits around the earth), which is an entity (indicated by "n"); the second commonest is a person who follows another (also an entity), the third most commonly occurring meaning is a celestial body orbiting around a planet or a star (also an entity); and the fourth is a modifier, indicating that something is surrounding and dominated by a central authority or power.

The present embodiment uses the WordNet™ lexical database, available from Princeton University, Princeton, N.J., USA, details of which are at http://www.cogsci.princeton.edu/~wn/. Other known databases, modified to have the structure herein where necessary, could be used.

Each meaning is displayed together with the meanings of hierarchically higher (i.e. broader) words. For example, taking the first meaning of satellite, a satellite is more broadly defined as equipment, and still more broadly defined as instrumentality or instrumentation, and still more broadly as an artefact (a man-made object) and still more broadly as an object (a non-living entity) and ultimately, as an entity.

The hierarchical storage within the lexical database 234 is achieved, for example, by providing each definition entry with a pointer field pointing to the entry of the immediately broader category entry into which it falls, and so on, and a pointer field pointing to the entry of the immediately narrower entries falling within it, as shown in FIG. 13.

Figure 12A:
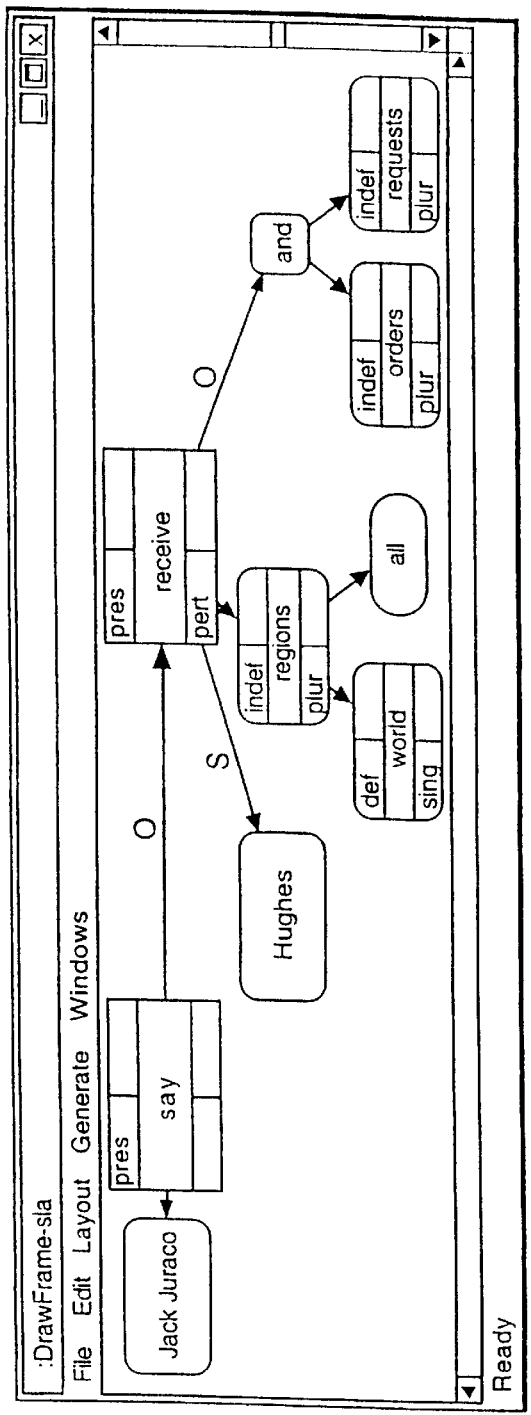
FIGS. 12a and 12b are screen displays showing the graphical representation of stored data at the terminal of the first embodiment, and the corresponding text generated therefrom.
Figure 12B:
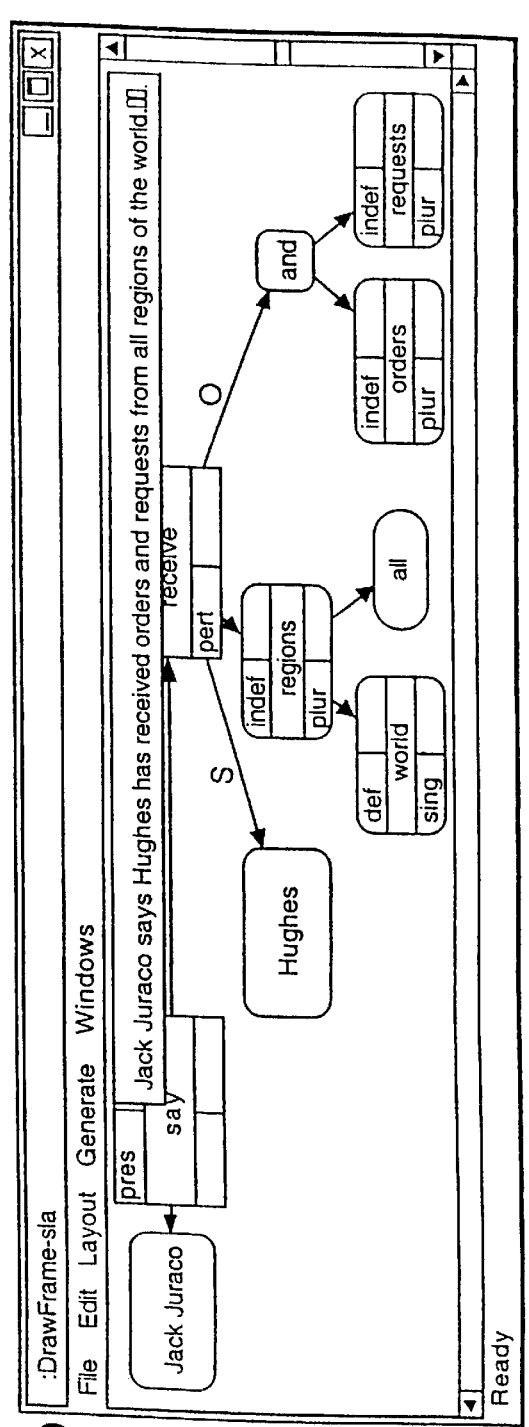

From the dictionary display area 410, the user may select one of the displayed meanings (e.g. by the use of a mouse) and, in response, the applet 116 is arranged to create a new object and display a corresponding image representation thereof within a drawing frame shown in FIGS. 12*a* and 12*b*, functioning in the same manner as the display area 406, described above.

Likewise, in the same way, having selected several such objects, the user may link them as described above by pointers and, having created a new displayed structure or edited an existing one, can cause the applet 116*a* to upload the results to the computer 200 as described above in relation to step 330.

It is thus possible, in this manner, for a user either to edit the data stored in relation to a document which has already been input from text as described above, or to create a new document directly without text input.

Alternatively, when the applet 116*a* is displaying a draw window as shown in FIGS. 12*a* and 12*b*, the user may select one of the objects (e.g. using a mouse) and cause the applet 116*a* thereby to send a message to the computer 200 to request the return of a document containing the data stored in the lexical database for the meaning associated with that object, which the applet 116 is arranged then to display. A user may thereby determine the meaning stored in relation to a particular part of a document which has been input, and determine whether it corresponds with the meaning which he intended.

Each entry in the lexical table, in this embodiment, also includes a code indicating (for example on a scale of 1 to 5) the difficulty, complexity or obscurity of the meaning concerned. For example, a code "1" may denote words whose meanings will be familiar to (and not objectionable to) children below the age of 16; a code "2" may denote a word the meaning of which will be known to most adults; a code "3" may indicate a word not in common use, and a code "4" may indicate a word used only by a technical specialist in some field (such as law or biology).

Data Storage

Each statement input by the user (typically corresponding to a sentence) is stored in the data store 240, in step 334. Where a single communications session between the terminal 100 and the computer 200 involves the input of multiple such statements, as will often be the case, a session or document record is created within the store 240 which includes separate entries for each of the statements.

Each such entry consists of a list of records (conveniently implemented as stored objects). Each object of such a statement record comprises an instance of one of the entity, state of affairs or modifier classes, storing a pointer 658 to the relevant meaning record within the lexical database 234, parameter data 660, and pointers 662, 664 to and from the other objects of the statement record, as described in relation to FIG. 7.

At the same time as creating a pointer from the object to the entry in the lexical database, a pointer from the entry in the lexical database 234 to the object is also created.

Each object also comprises a field storing time-stamp information, specifying the date on which the session took place (or on which the information concerned was most recently modified). The entry in this field is supplied from the date/time function of the real time clock of the computer 200 when the data is stored.

Further, each object includes a field 652 indicating the name of the author or, at any rate, name data supplied by the user of the terminal 100 in inputting the text. Finally, each object includes an access rights field 656 including a code specifying to which classes of person the information is to be made available.

Figure 14:
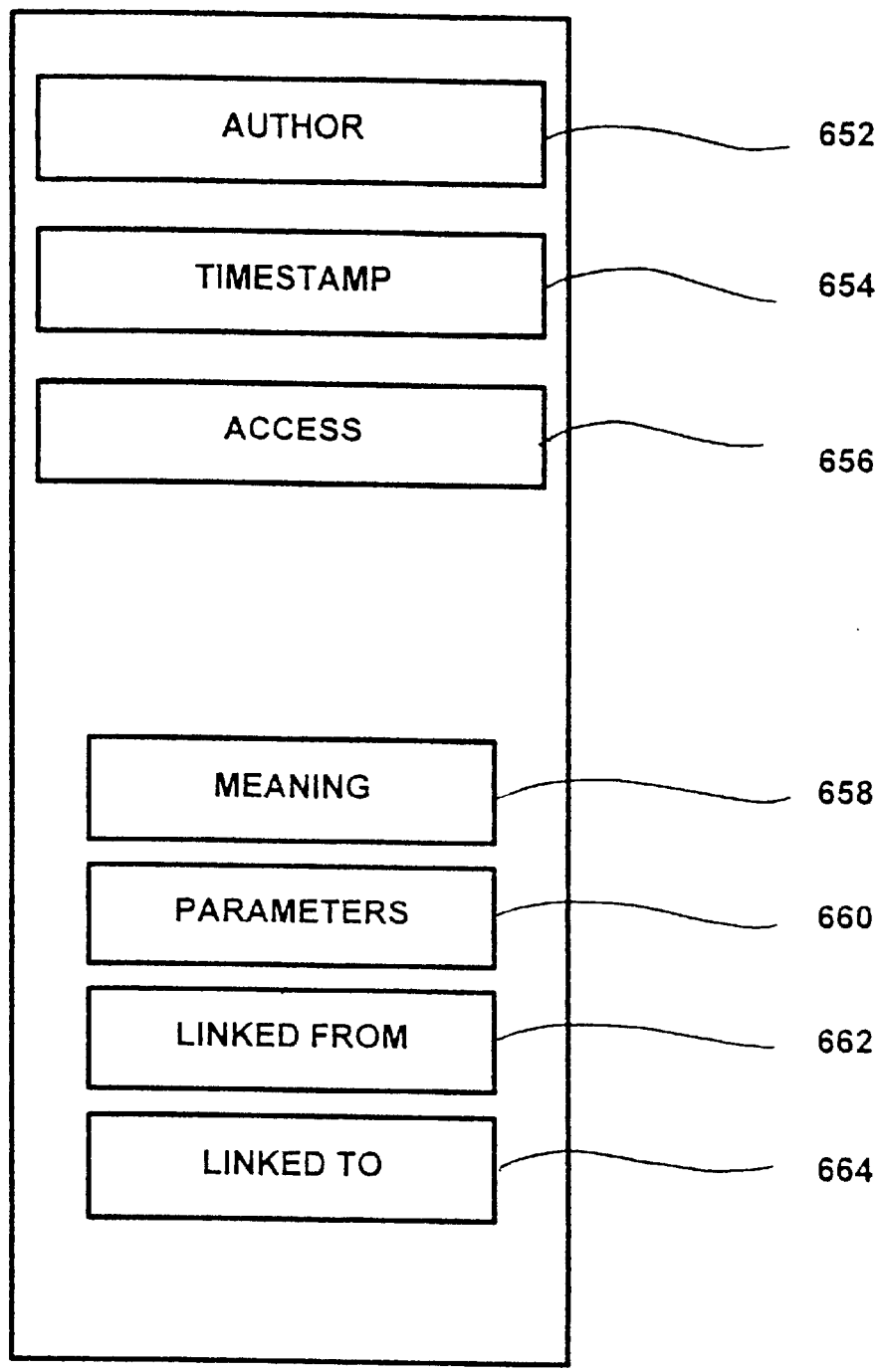
FIG. 14 is a diagram showing the contents of a word record within a store forming part of FIG. 9b.

For instance, the access code may include bits specifying that the relevant information is only to be supplied to users with an appropriate password; bits indicating that the information is to be supplied only to a person whose name corresponds to the author of the information; bits specifying that the information is not to be supplied to a person under a given age (such as 16); and bits specifying that it is a personal name. The structure of the data within one such object is shown within FIG. 14.

In greater detail, the manner in which this data is entered into the additional fields 652–656 is as follows. On the commencement of a communication session at the terminal 100, the applet 116*a* displays an editable form, into which the user may add access information or an author name, to be applied to all text input in the session.

Additionally, during the session, the user may select any displayed word object, and is presented with a form for inputting access codes to be associated with that particular object or group of objects. Finally, on each occasion where a new word is input, amongst the other data to be input is an access code.

Further, at the host computer 200, on storage of the data subsequent to parsing, a time stamp recording the current date is added to the time stamp field 654 of each object record created, and the author name supplied from the terminal 100 (or in its absence, some identification of the terminal 100 itself) is inserted in the author field 652.

Finally, some entries within the lexical database, (corresponding for example to classified military items) may have an associated access codes, or part of an associated access code, indicating to whom they are to be made available, and this is copied into the access code field 656 of the created object which instantiates the entry into the lexical database.

Data Retrieval

The data retrieval process according to this embodiment comprises two phases; searching and output text generation. The text generation stage may also be used independently of data retrieval.

Figure 15A:
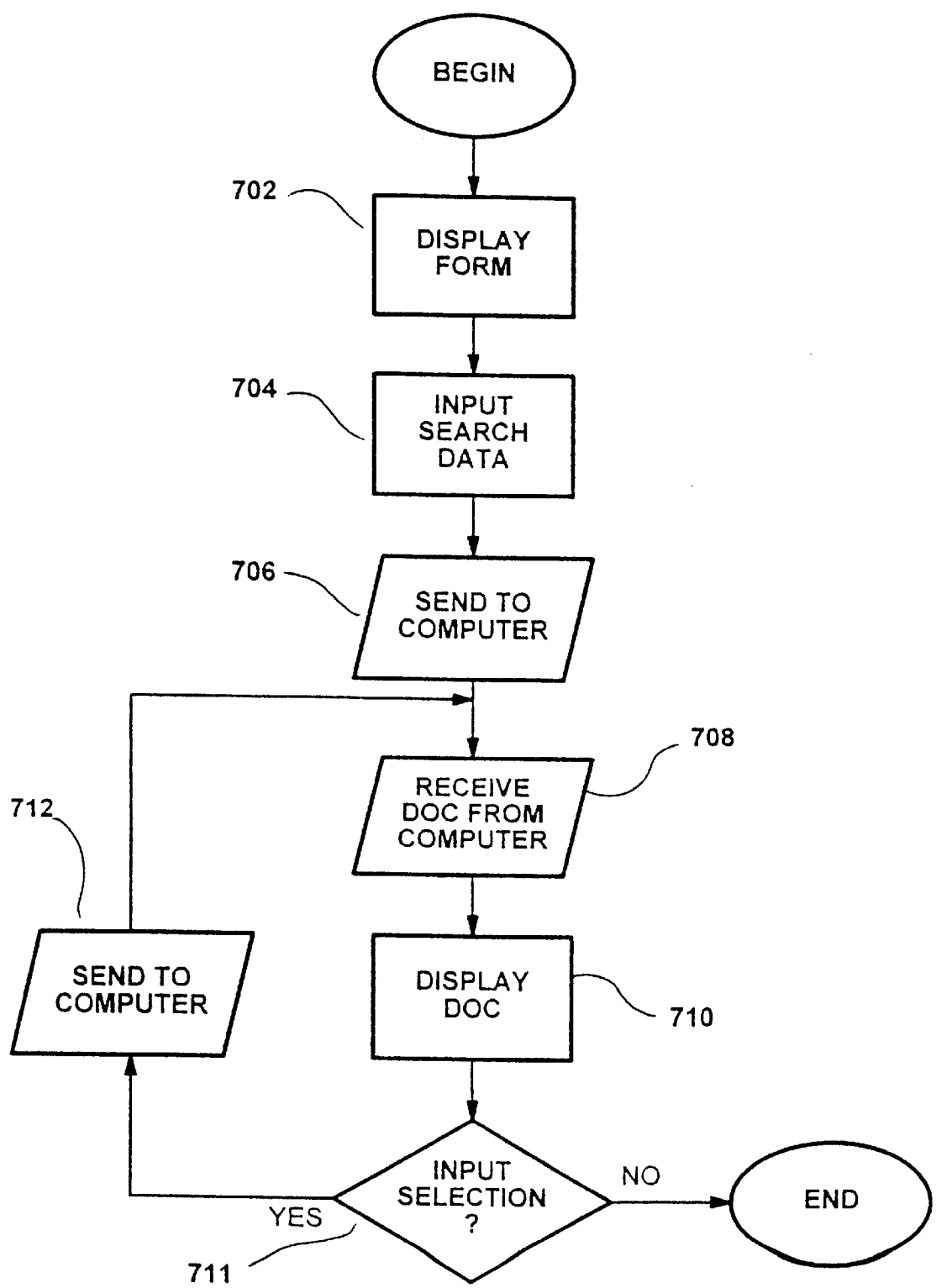
FIG. 15a is a flow diagram showing the process of data retrieval performed by the terminal of FIG. 1.
Figure 15B:
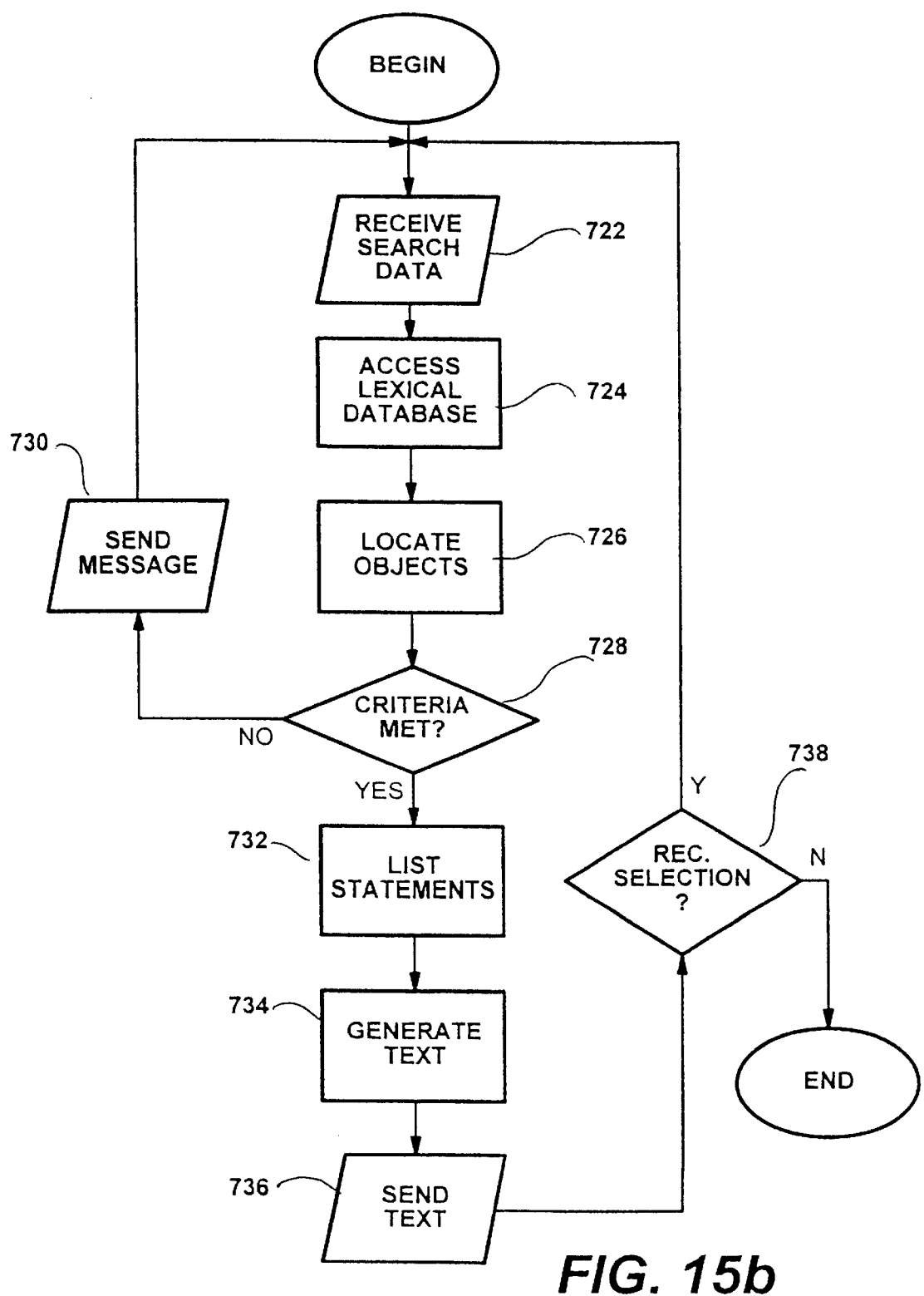
FIG. 15b is a flow diagram showing the process of data retrieval performed by the server of FIG. 1.

Referring to FIG. 15, 15*a* shows the data retrieval process performed by the terminal 100 under the control of the applet 116, and FIG. 15*b* shows the data retrieval process performed by the computer 200 under control of the application 216.

In a step 702, the applet 116*a* displays a search form on the screen.

The search form includes a field for entering the searcher's name; a field for entering access rights information (such as a password or authorisation code); a field or fields for the entry of a date range; a field for entry of an obscurity level (for example, one of the levels referred to above); a field for entering an output format; and fields for the entry of search terms.

The display comprises an editable form within which the user enters, on respective parts of the screen, the information for each field. On completion of the form by the user (step 704) using the keyboard 102, the applet 116*b* transmits (step 706) the search data to the computer 200.

In step 722 (FIG. 15*b*) the computer 200 receives the search data. In step 724, the application 216 scans the search terms which have been input and determines whether the terms are present in the lexical database 234, and accesses the record in the database 234 for each term.

If one or more search terms is not present in the database, then (in the same way as described above in relation to data entry codes) the user is prompted to enter a definition or to correct the term.

From each relevant entry in the lexical database 234, the list of objects to which that term points is used to locate each stored object corresponding to an occurrence or instance of that term within a stored statement (step 726).

Where multiple search terms have been input by the user, in step 704, the applet 116 is arranged to permit the user to specify the relationships between the multiple input terms. For example, the user may be searching for storage in which a dog bites a man (or vice versa), in this case the terms "dog", "bite" and "man" are input as search terms, and in relation to the state of affairs "bite", the user is prompted to specify the active and passive entities associated with the state of affairs (in other words, to specify that the dog bites and the man is bitten). This is conveniently achieved by creating the statement which is to be searched for in the same manner as described above in relation to data input.

As the entries in the lexical database are hierarchically ordered, the entry for "dog", for example, may refer to hierarchically lower entries (for example, for "alsatian", "collie", and so on). In this case, the application 116 also locates all hierarchically lower entries in the database 234, and in step 726 locates all objects which instantiate those entries.

Having located all objects which relate to the search terms, in step 728, the application 216 locates those statements which include all of those (for example, in this case, all statements which include a "dog" object (or an object relating to any hierarchically lower term); a "bite" object (or any hierarchically lower term) and a "man" object (or any hierarchically lower term)). It then determines whether those objects are in the relationship specified by the user, so as to locate only those statements where the dog is the biter of the man, and not those where the man is the biter of the dog, or the terms are in some other conjunction.

If no such statements are located, then in step 730 the application 216 sends a message indicating that the search was unsuccessful to the terminal 100, as will be described below in greater detail.

If one or more statements meets the search criteria then in step 732 the application 216 compiles a list of all such statements and in step 734 the application 216 generates, from the stored object data, text corresponding to each statement, which is sent in step 736 to the user terminal 100, as a display document (for example a hypertext document).

In step 708, the document is received at the user terminal 100 and in step 710 the applet 116b displays the document received, including the generated text of the relevant statements.

In step 711, as will be described in greater detail below, the applet 116 permits the user to select one or more terms from the displayed document (e.g. by selecting a hypertext link within the displayed document) and on such selection, the applet 116b indicates back to the computer 200 the selected hyperlink in step 712.

On receipt of such a selection, in step 738, the application 216 reverts to step 722 to repeat the search, in the manner described above.

It will therefore be seen that according to this embodiment, the user is able to retrieve parts of documents which include predetermined entities in predetermined relationships, rather than searching for all occurrences of words in conjunction (as is the case with current key word or full text based database retrieval techniques).

Further, because a lexical database is employed in which multiple meanings of given words are recorded, on generating a search, a user is able to select the correct and unambiguous meaning of a term with two meanings, by utilising, for example the above data input method to define the search criteria.

Further aspects of the data retrieval process will now be described.

Generation of Text

The process of generation of text from a semantic representation is generally known, for example from our above-referenced earlier patent application or the above reference by Allen. It generally consists of the reverse process to parsing and analysis, but without the ambiguity of analysis.

Figure 16:
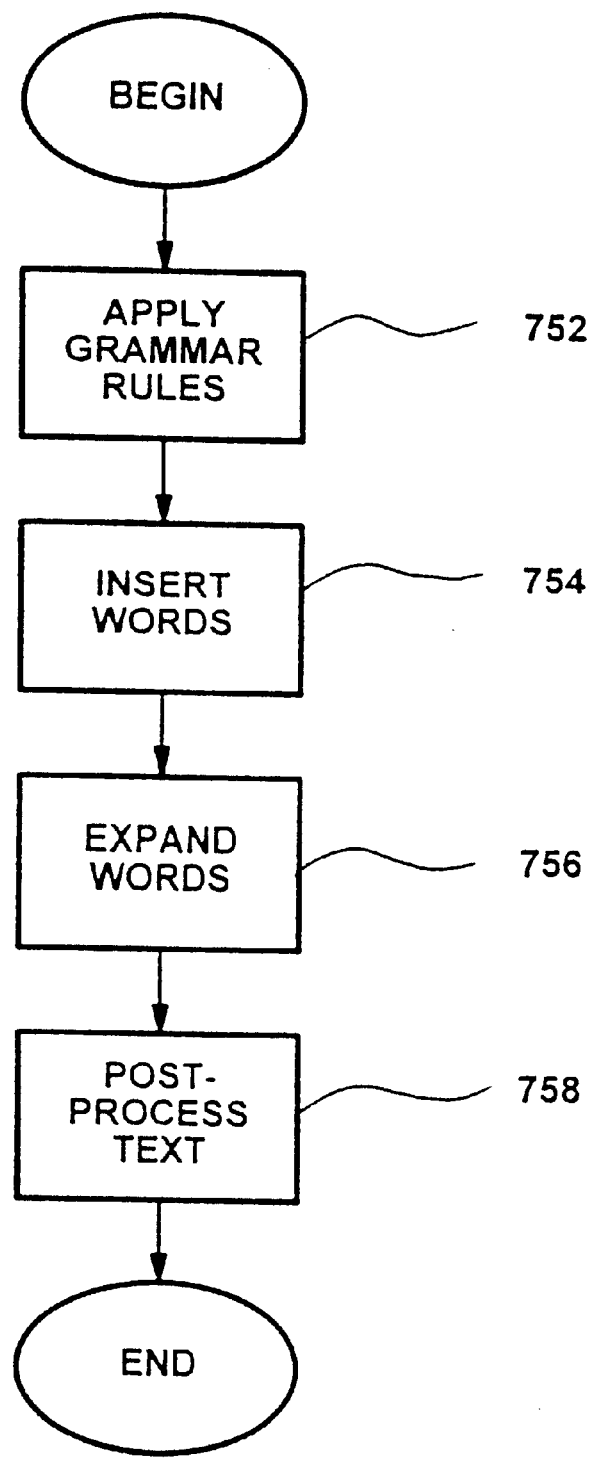
FIG. 16 is a flow diagram showing the stages of text generation performed by the server of FIG. 1 as part of the process of FIG. 15b.

Thus, referring to FIG. 16, on generation of text the application 216 is arranged to apply the grammar rules stored in the database to the selected objects (step 752), and thereby to build up a stream of text. The word corresponding to each object is then inserted into the position of that object in the stream (step 754), and the correct expanded form of each word is inserted by referring to the expansion database 232 (step 756). Subsequently some text post-processing is performed (step 758), to insert any conventional contractions (such as "I've" for "I have" in English) and properly handle proper names and numeric and date forms.

In the present embodiment, the applet 116b is arranged to be capable of requesting the generation of text from a displayed graphical representation at any point during data input or retrieval, by signalling a list of objects from which text is to be generated to the computer 200 which generates the text and returns it as a document for display by the applet. FIG. 12b illustrates the text thus generated from the data shown in FIG. 12a.

Further Details of Data Retrieval

The other data entered by the user in this embodiment is also advantageously used in assisting data retrieval.

For example, date information may directly be entered to specify retrieval of only statements input between specified dates, and author information may be used to locate only information originating from certain authors.

Complexity information may be used to filter out the retrieved information. For example, where a particular retrieved statement is determined by the application 216 to include an object corresponding to an entry in the lexical database 234 with a high level of complexity or obscurity, that object may be omitted from those from which text is generated, as described below, or may be substituted by a hierarchically higher, and hence more general, term (where this has a lower obscurity rating in the lexical database 234).

The applet 116b preferably generates the search form to include two selectable areas, for indication of "more complexity" and "less complexity", enabling the user, in response to an output document, to indicate whether future output should use material of a higher or lower obscurity level.

Finally, the access or security information may be used to exclude from the generated text those objects corresponding to semantic items for which the access information obtained from the terminal 100 indicates that the user should not have access.

Generation from Partial Information

It will be apparent from the forgoing that a sentence of the type "Fred Smith says that the dog bit the man" is represented by three entities ("Fred Smith", "dog", and "man"); and two states of affairs ("say" and "bite"). One feature of the present embodiment is that on deletion of one object, for example "Fred Smith", the application 216 can still generate text from the remainder.

Referring to FIGS. 12a and 12b, FIG. 12a shows the graphical representation of semantic objects, from which, on selection by the user, the application 216 is arranged to generate text saying "Jack Juraco says Hughes has received orders and requests from all regions of the world", as shown in FIG. 12b.

If the "Jack Juraco" object is removed from the list of objects from which text is to be generated, the application 216 can either:

Replace the reference by a hierarchically higher term (to generate "A man says Hughes . . . ")

Omit the object but leave in place the state of affairs "say". In this case the application will generate in the passive voice "It is said that Hughes . . . "

Omit the state of affairs "Say" also. In this case, the application 216 will generate "Hughes have received . . . ".

It will often be desirable to suppress personal names from many classes of material, such as Court reports where witnesses cannot be named, or unattributable statements from officials. This aspect of the invention allows this type of automatic suppression without loss of the information, in response for example to an access code of the user of the terminal 100.

In the present embodiment, where statements are input by an author, on storage of the corresponding data, the application 216 is arranged to create an additional entity object representing the author, and a "say" state of affairs object, so as to attribute all statements input by an author to that author. Such automatically created objects are accorded an access code, which inhibits their retrieval by casual users, who will usually be more concerned with the content of the statements than with their provenance.

Likewise, if for example a particular weapon designation is recorded in the lexical database as being confidential or classified, or the particular instance of that designation recorded by an object is so classified, the application 216 may substitute a hierarchically higher term (e.g. "missile" or "weapon") or may generate text by omitting the term altogether and substituting the passive voice (where possible).

Thus, this aspect of the invention allows retrieval of as much information from a document as is not classified or otherwise controlled, and permits it to be presented in a comprehensible fashion.

Hypertext Output Format

It will be understood that this embodiment permits, and preferably provides, many different output formats for the document generated by the application 216 to represent the retrieved data.

Figure 17:
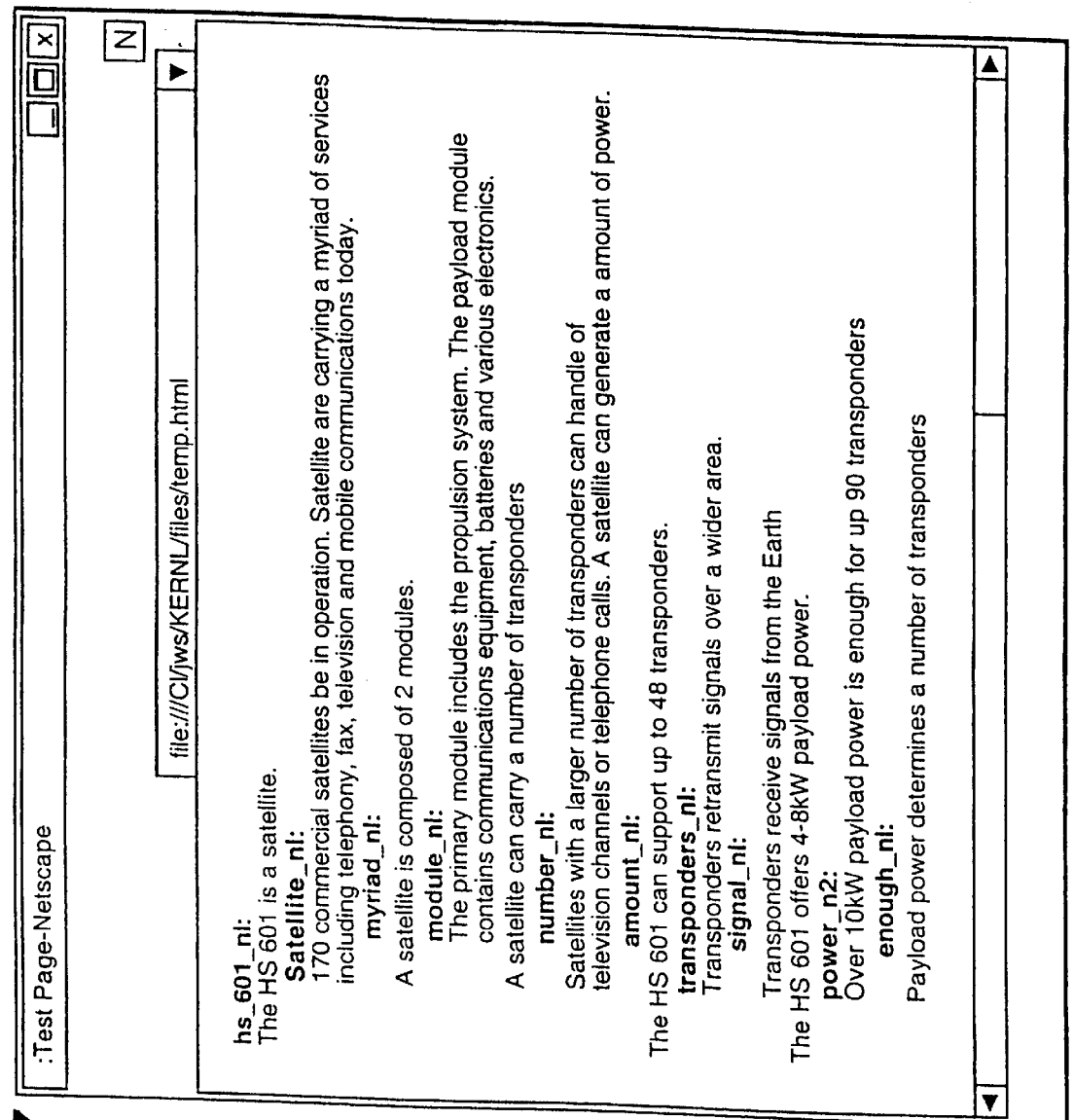
FIG. 17 is a diagram showing the screen display of the results of data retrieval in textual form.
Figure 18A:
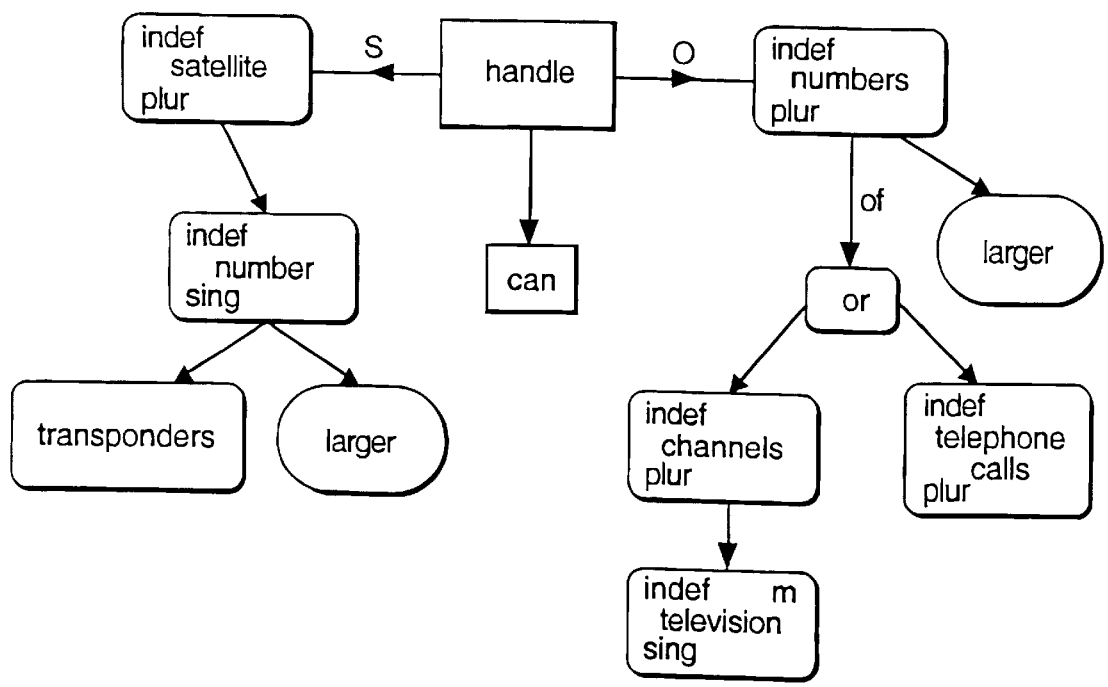
FIGS. 18a and 18b show the corresponding graphical representation thereof.
Figure 18B:
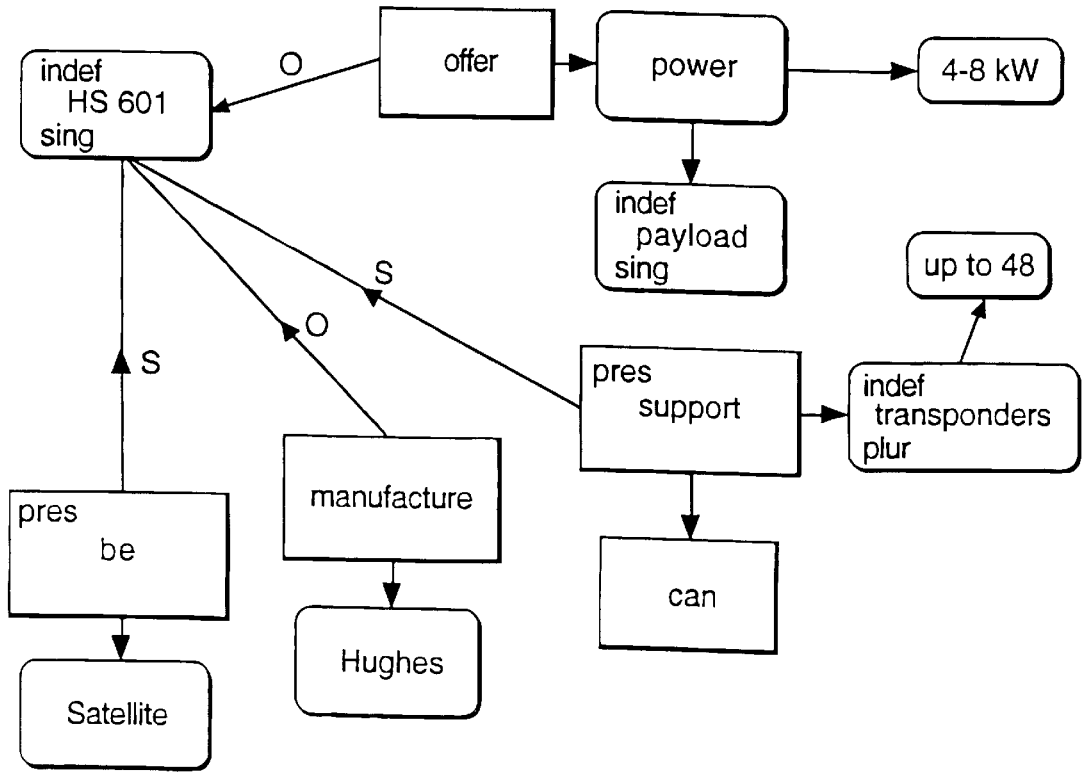

One preferred format is illustrated in FIG. 17, representing the information in FIGS. 18a and 18b, in response to a search term "HS_601" (a type of satellite manufactured by Hughes).

In this representation, each retrieved statement including the term "HS_601" is represented as generated text. Additionally, each other entity present in the statement for which further statements are available is individually represented in text below the statement, and below each such representation are reproduced any statements including that entity which are present in the same stored document within the computer 200.

Thus, below the statement "The HS 601 is a satellite", the term "satellite" is represented, and the other three statements concerning satellites in the document are generated and appended to the document. Below the first such statement, which includes the term "myriad", this term is represented. No further statements including this term are present in the document.

Below the second statement, which includes the term "module", this term is represented, and a further statement in the same document which includes this term is generated.

Any of the represented terms can be selected by the user from the displayed document generated by the application 216 and displayed at the terminal by the applet 116, by using the keyboard or mouse 106.

On such a selection, in step 712, the applet signals the selected term as a new search term to the computer 200 and the application 216, on receipt at step 738, repeats the search at step 722 and returns a new output document including:

Definition data, where present, from the lexical database 234, and;

Any statements stored in the computer 200 including the selected term, as discussed above, and represented in the same manner as shown in FIG. 16.

Thus, a user can move from an original search topic to related topics and retrieve data held on those related topics.

Watching Search

The search criteria specified by the user may include a specification that the search is to be updated when new information meeting the search criteria is obtained.

The application 216 is arranged to execute such a specification in one of two ways:

By periodically re-executing the search, but with an additional time constraint that only statements having timestamps within the update period (and therefore after the original search) are located, or;

By setting a trigger to report any new items containing the search criteria to the user.

User Profiles

Some of the search data received from the terminal 100 may be stored in a user record relating to the user, which is used to modify future searches. In particular, the level of complexity or obscurity of material requested by the user may be used to set the level of complexity of items retrieved in future searches.

Second Embodiment

The second embodiment adds to the first the option of references to documents in media other than text. Thus, on data input, the applet is arranged to allow the user to specify, for a graphical display element, statement, or complete document, a linked image file, sound file, video file or other related document.

The first embodiment is modified in that, after supply from the computer 200 of the object data for display at the terminal 100, one of the forms of editing allowed is to specify a link to a file containing the linked document, by inputting the file address (e.g. from a browse screen display).

The applet 116, in response, is arranged to create a visually distinctive graphical element representing the linked document, and identifying its media type.

On signalling the edit results to the computer 200, either the file itself is uplinked to the computer 200 and stored thereat by the application 216, or (where the document is available at another server computer) a reference to the address of the document (e.g. its URL) is transmitted and stored in the lexical database 234. The lexical database may also include stock multimedia material, in the manner of existing multimedia encyclopaedias such as Encarta™ available from Microsoft Inc.

Further, where other data is available to the computer (e.g. in the form of a relational database holding information on one or more of the lexical entries in the lexical database 234) the application 216 also stores a reference to such other data.

Finally, the application is arranged to store the originally-input text of the document, as it is typed in by the user and uploaded from the terminal 100, as an archived document, and the output document includes a link to the archived document, allowing it to be retrieved in its entirety where required for direct quotation, for example.

On data retrieval, the document output to the user is a hypertext document, with links to cause the inclusion of such other material in various media as is available.

Third Embodiment

In the above-described embodiments, the description assumes that the generated text is in the same language as the originally input text.

However, the analysis of the input text, into semantically meaningful entity, state of affairs and modifier elements, results in a representation of the input statements which is substantially language-independent. The present embodiment utilises this to generate text in languages other than that in which the document was input. Our above-referenced earlier patent application discloses aspects of suitable parsing and generation methods which may be used in this embodiment.

Figure 19:
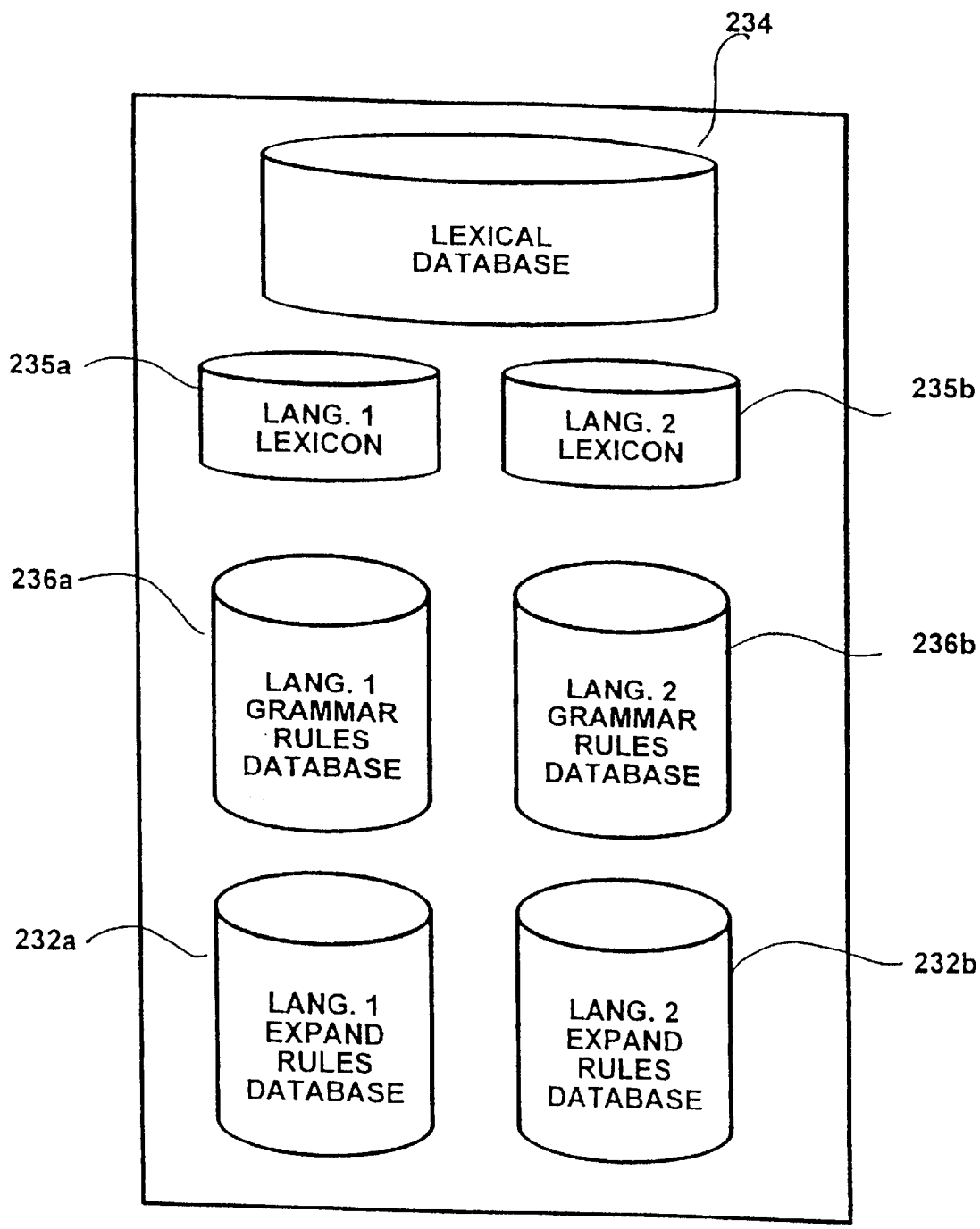
FIG. 19 corresponds to FIG. 9a, and shows the data stored for a third embodiment of the invention utilising multiple languages.

Briefly, referring to FIG. 19, the computer 200 stores a plurality of grammar rules databases 236a, 236b, . . . and corresponding expansion databases 232a, 232b , . . . Each pair of databases 232, 236 relate to a given language. On text input, the user specifies the language of the text (the source language), and the application 216 accesses the appropriate expansion and grammar rules databases to analyse the text.

The lexical database 234 in this embodiment comprises a plurality of language-specific lexicons 235a, 235b, . . ., each containing a word list for the language concerned, with each word of the list including a pointer to one or more entries in the lexical database 234, which stores entries comprising meaning data for meanings of each word, and a pointer back to each word for which the entry is a meaning.

As many words in different languages are directly translatable (in the sense of sharing a common meaning), many meaning entries in the lexical database 234 store pointers to words in each language. Not all words are directly translatable, and where meanings differ, the lexical database 234 includes additional, language-specific definitions with pointers from words in only those languages in which they occur.

On entering a search profile, the user specifies the language of the output text (the target language) and the application 216 accesses the lexical database, selects the words from the target language lexicon which are pointed to by the lexical database entries, applies the relevant grammar rules from the target language grammar rules database 236 to generate output text, and expands the word forms using the target language expansions database 232.

Words which are not directly translatable may be substituted by a hierarchically higher, directly translatable meaning (e.g. "dog" for "alastian"), and/or passed on untranslated. Alternatively, rules for abstraction or language-to-language translation may be used as disclosed in our above-referenced earlier application.

Fourth Embodiment

Figure 20:
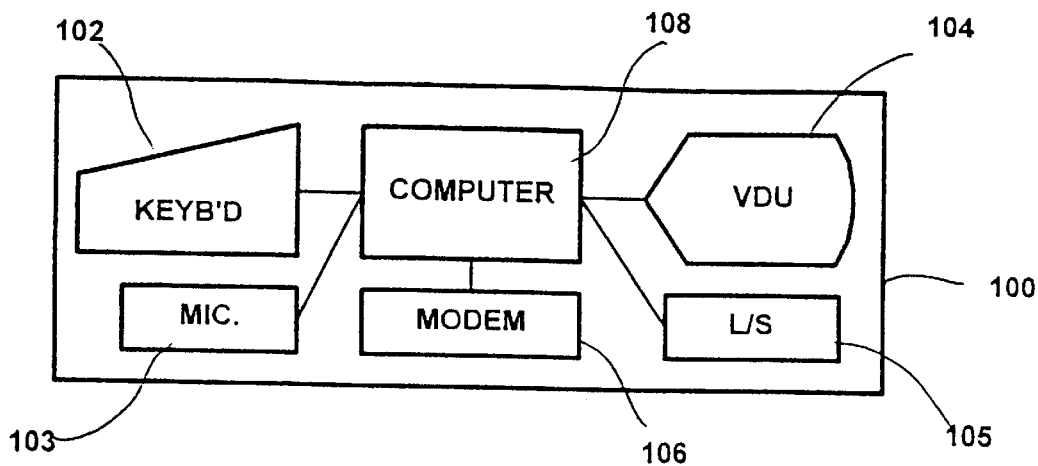
FIG. 20 is a block diagram of a terminal utilised in a fourth embodiment of the invention and corresponding to that shown in FIG. 1.

In earlier embodiments, the input document is typed into the terminal 100 as text via the keyboard 102. In the present embodiment referring to FIG. 20, the terminal 100 is provided with a microphone 103, and the input text is dictated and transliterated by a speech-to-text conversion program 115, such as ViaVoice™ available from IBM Inc.

The input speech is reproduced as text in a text input area of the screen 104, and in other respects the present embodiment operates as described above.

It is advantageous to provide the speech recognition at the terminal 100, where it is possible to train on the voice of the individual user, rather than centrally. Also, since text rather than audio is uplinked, the required uplink bandwidth is kept low.

On the other hand, providing the generation centrally avoids the need to store multiple rules databases locally at terminals.

In this embodiment, the terminal 100 may also comprise a microphone, and a text to speech program arranged to synthesise speech from the text received from the computer 200 to provide audio output via a loudspeaker 105.

The applet 116 may also be arranged to generate a visual display to represent the output data; for example, a representation of a human face, or entire human head, animated in synchronism with the output speech as described in our earlier application EP-A-225729, or a sign language display comprising an animated representation of a pair of hands generating sign language (for example British or American sign language) from a text to sign language converter program. This latter embodiment is particularly advantageous for those with hearing difficulties.

Fifth Embodiment

In this embodiment, the data input aspect (but not the data retrieval aspect) of the first or fourth embodiments is utilised to derive a specification for writing a computer program, from which such a program may be generated automatically.

A specification should consist of a set of statements about the functions which a program should perform. In particular a telecommunications control program for controlling operation of intelligent network functions will often take the form of an indication of the actions performed in response to the occurrence of certain conditions. For example, where a called party line is busy, a "call waiting" alerting function alerting the user to another incoming call may be performed.

Figure 21:
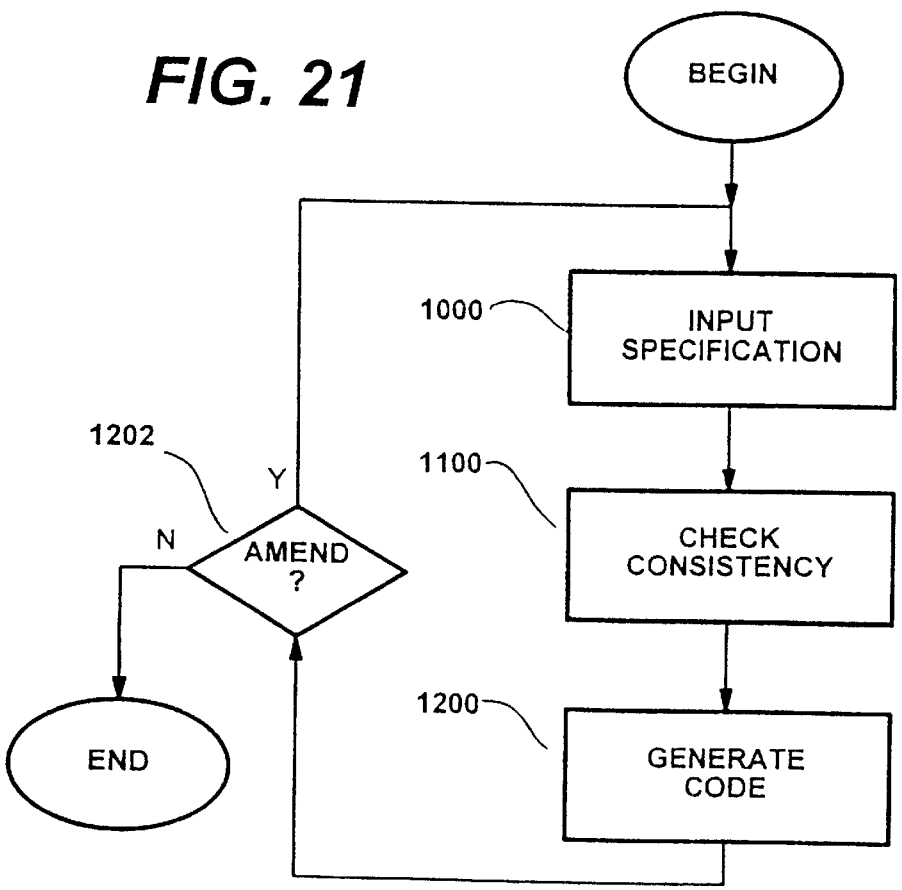
FIG. 21 is a flow diagram showing the process of code generation according to a fifth embodiment of the invention.

Referring to FIG. 21, the process of generating a computer program according to this embodiment proceeds through three broad stages; a specification input phase 1000, a validation phase 1100, and a code generation phase 1200.

In the specification input phase, a series of performance statements specifying the functions to be performed by the program are input, as described in the first embodiment. Any ambiguities in each statement are therefore detected and corrected on input. This stage will therefore not be described further.

In the second stage, the consistency checking performed is not exhaustive but consists of two checks. Firstly, a causality check is applied, by generating, from each statement which implies that event A causes an event B (for example, that a busy called line will cause a call divert), a graph indicating that A must occur before B, and then aligning the results thus generated to determine whether any impossible sequences (where, for example, A is expected to cause B but B is expected to cause A) have been specified.

Secondly, some consistency checking can be performed by inference rules, using the hierarchical dictionary. For example, if in one statement all events of a certain type are specified to lead to one result, and yet in another statement a specific event of a hierarchically lower (i.e. narrower) class is stated to lead to a different result, the inconsistency is detected by examining, for each statement concerning a narrow (i.e. hierarchically lower) semantic element, all statements made about that element or hierarchically higher elements, to flag inconsistencies.

These consistency and causality checks are performed on each occasion when a new statement is entered. Thus, the likelihood of entering inconsistent specifications is reduced.

Having entered the specification (step 1202), code generation may be performed automatically using a suitable compiler for compiling from high level to some description languages, or may be performed manually.

Sixth Embodiment

It will be clear from the foregoing that the invention provides a data retrieval system in which multiple authors can conveniently work upon the same body of information, by adding new links to concepts stored within the server computer 200, for retrieval by (possible multiple) different users.

In this embodiment, data input is accelerated by maintaining the features of a graphical display of the input text representing stored linkages between the information represented therein, and giving the possibility of parsing the information. However, data input is accelerated by permitting the graphical input of text prior to full semantic analysis, for subsequent semantic analysis and disambiguation.

In this embodiment, as in the preceding embodiments, the entry of text takes place via a computer terminal running a programme (which may be an "applet" running through a hypertext browser programme).

Figure 22:
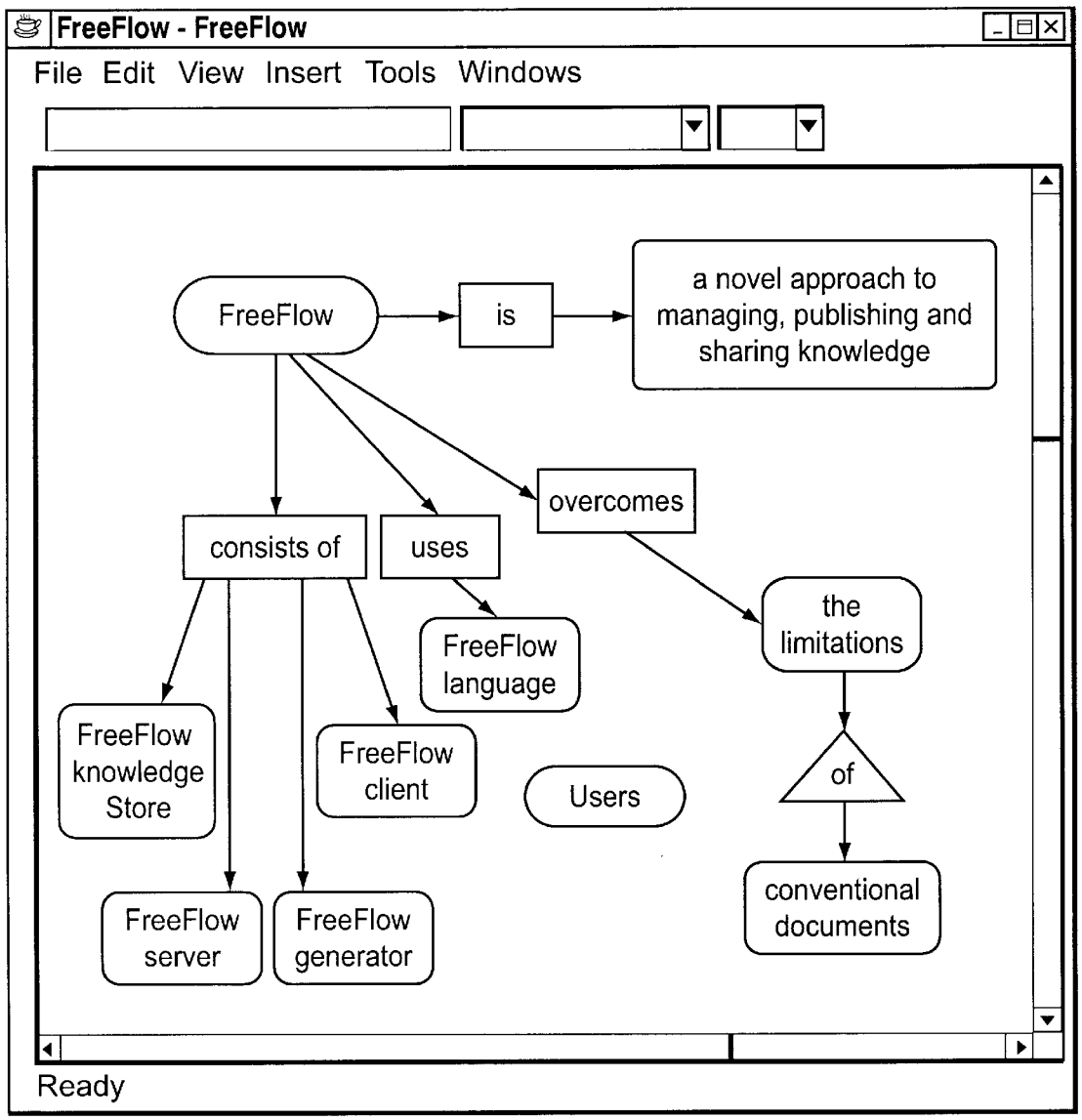
FIG. 22 shows a screen display of stored text according to a sixth embodiment.

FIG. 22 illustrates the screen display produced. It will be seen to consist of a number of text-containing shapes. As in the previous embodiment, the shapes for intervisually distinctive classes; thus, verbs or states of affairs are represented as rectangles of a particular colour such as green; entities are represented by a rounded rectangle, preferably also in a different colour (such as blue), and modifiers are represented by a lozenge shape. In this embodiment, prepositions connecting to entities, such as the word "of", in English are also represented graphically, as triangles in this case.

In addition to these shapes, a default text shape (shown here as a gray rectangle) is provided, into which free-form text may be entered. In FIG. 22, the box containing the words "a novel approach to managing, publishing and sharing knowledge" constitutes such a default shape.

Linking the shapes are arrows, representing graphically the connections between the components (entities, states of affairs and modifiers) in the original text.

Figure 23:
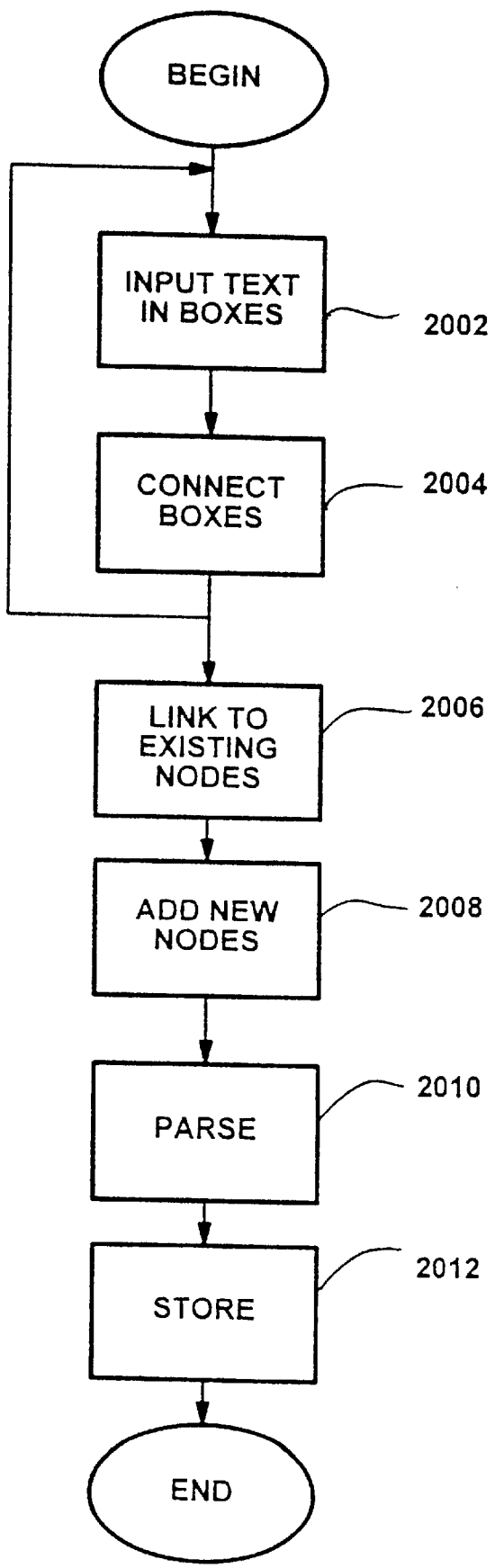
FIG. 23 is a flow diagram showing schematically the process of inputting text according to the sixth embodiment.

Referring now to FIG. 23, to input new stored text, in a step 2002, a user inputs text into the terminal 100 via the keyboard 102. In this embodiment, unlike the previous embodiment, the user first creates a new box (by default, a default box) by some suitable action such as "right-clicking" the mouse, and then text typed by the user on the keyboard is entered into the box.

Existing boxes may be selected by "left-clicking" the mouse, and the text therein amended.

Once a box ceases to be selected (for example because another box has been selected), the terminal 100 transmits a signal to the server 200 indicating either a creation of a new box, or the change of text in an existing box. The server 200 creates or amends a corresponding stored record. Each box therefore corresponds to a record on the server 200, which initially contains the text stored in the box.

In a step 2004, a user may create links between the boxes, using the mouse (for example using a "dragging" action of the mouse). Each such link is directional, having a source box and a destination box, and the terminal 100 is arranged to graphically represent the link by a line with an arrow indicating the direction of the link, running between the source and the destination boxes.

As in the previous embodiment, information on each link thus created is transmitted to the server 200 and a corresponding alteration to the data stored therein is made, to link the records representing the source and destination boxes.

As is shown in FIG. 22, this graphical display provides a method for users to enter text in a way which also conveys some meaning. Users can structure and group their ideas by arranging and grouping the boxes, and connecting them with connecting lines.

For example, the ideas in the display concerning the entity which is a program referred to as "FreeFlow", use a single box to represent that program in all of the different statements made about it. That box, containing the text "FreeFlow", is connected to four boxes representing states of affairs, containing respectively the text "is", "overcomes", "uses", and "consists of".

Each of these is then connected to further boxes; a box containing text describing what FreeFlow is; a box containing text describing what FreeFlow overcomes; a box containing text describing what FreeFlow uses, and four boxes containing text describing what FreeFlow consists of.

In some respects, therefore, the display of FIG. 22 resembles an entity/relation graph, but it is unconstrained by formal logic at this stage, and a user can simply enter text as desired and connect the text.

After this stage, then, the text entered (and stored at the server 200) is distinguished over the corresponding free text which might have been entered as a normal document by the following features:

1. All statements about a given entity (e.g. "FreeFlow") refer back to the same record representing that entity.

2. Some structure is recognisable in the stored data, by virtue of the links.

In a step 2006, on execution of a command by the user (such as selection of a button displayed on the display using the mouse) the data contained in the boxes is reconciled, to the extent possible, with data already contained at the server 200. Accordingly, at the server 200, the text within each box is examined and compared with text in the lexical database 234 and any other databases of existing concepts.

In some cases, there will be an exact correspondence between the text contained in the boxes and records held in the lexical store 134. For example, "is", "uses", "overcomes", "of", and "consists of", will all be recognised as corresponding to lexical database entries.

In such cases, the text held in the record of the server 200 is augmented by a pointer to the lexical database entry, and the shape displayed is selected so as to match the recognised characteristics of the text (for example, to indicate whether it is an entity or a state of affairs).

The connecting line pointer records are used to interpret the attributes of the recognised item of text; for example, if the recognised item of text is a verb, the connecting lines may be used to determine the subject and object of the verb.

Figure 24A:
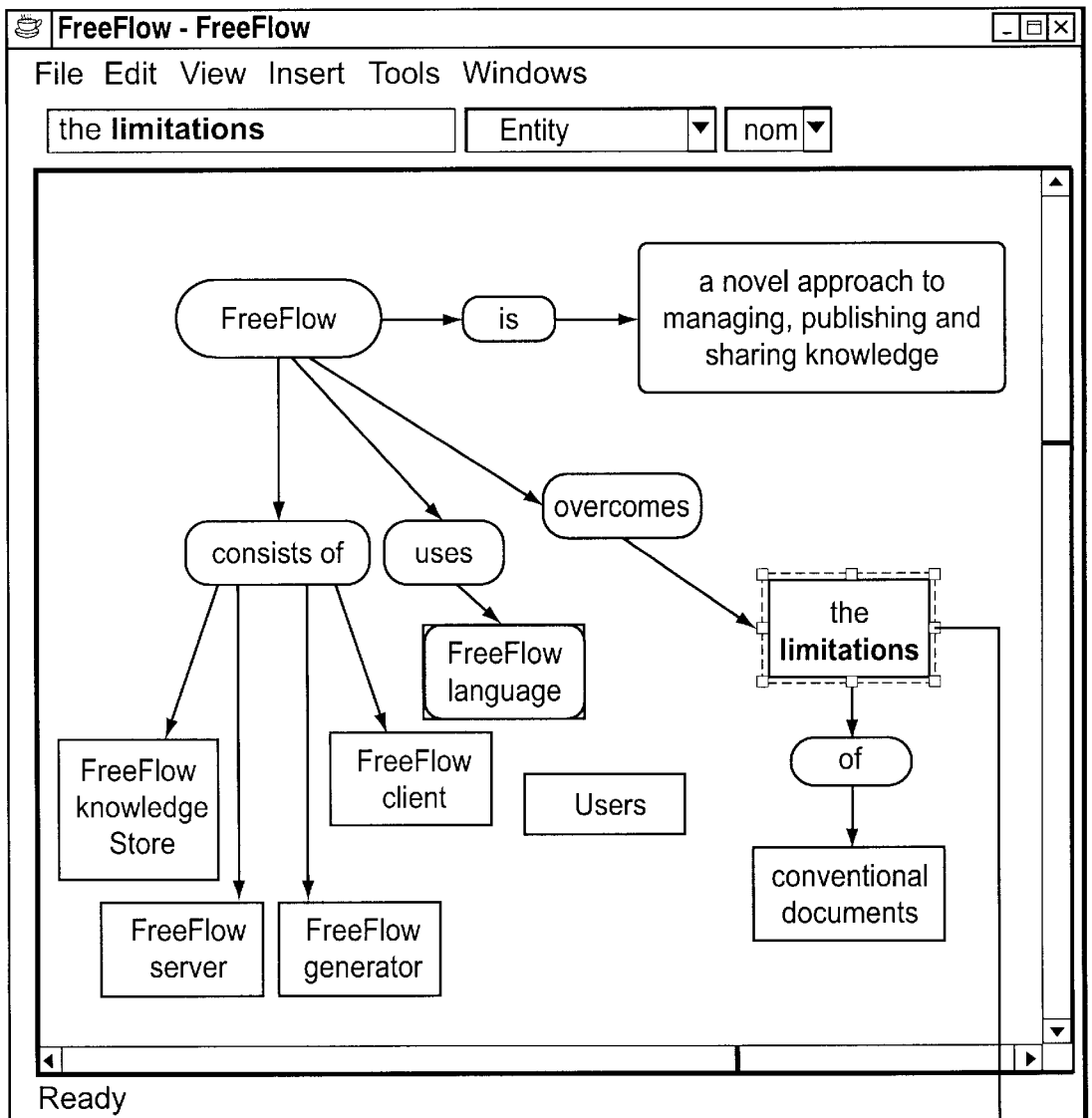
FIG. 24a replicates the display of FIG. 22 with a word highlighted.
Figure 24B:
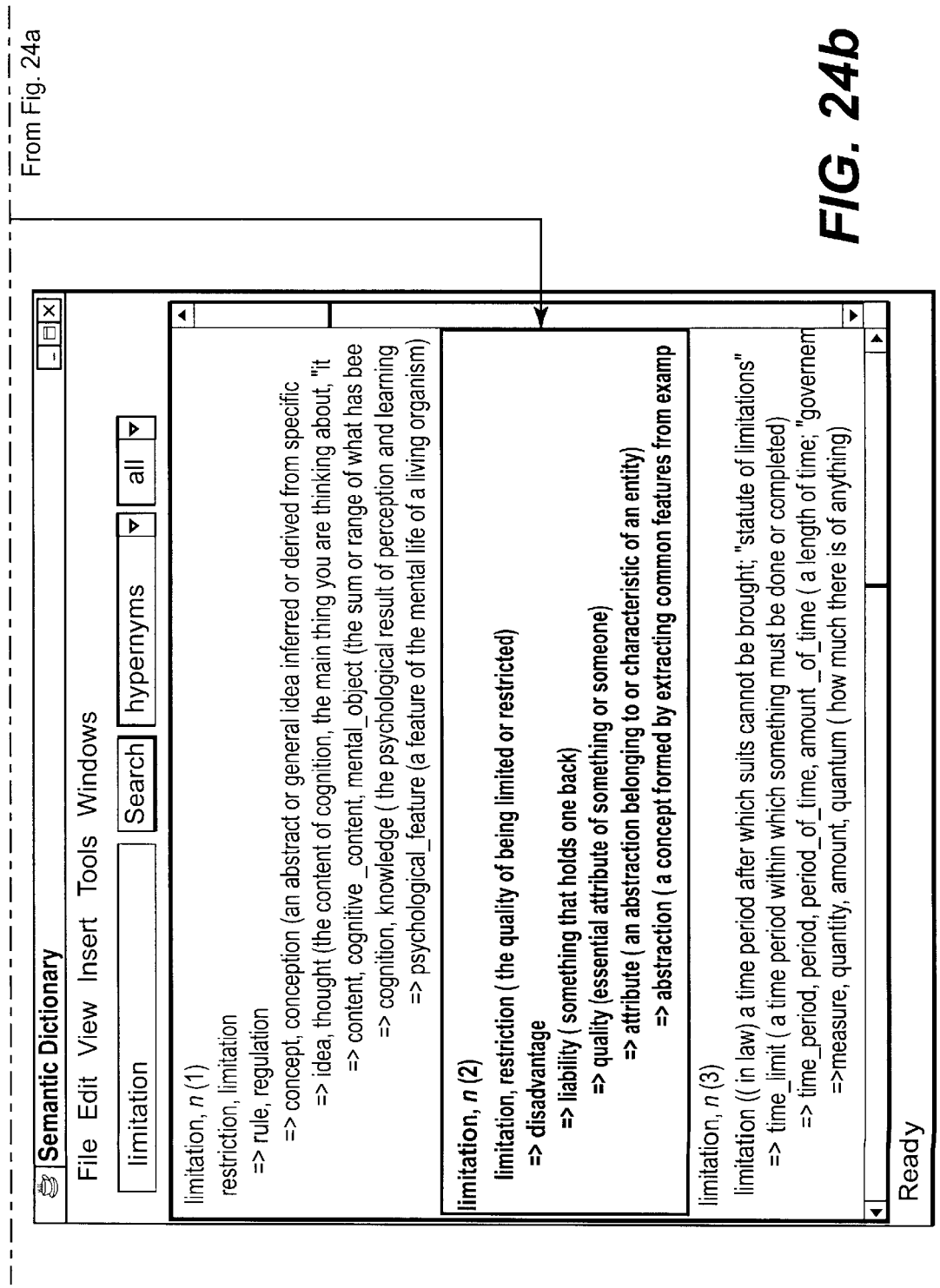
FIG. 24b shows a display of multiple possible meanings for the word.

In some cases, a recognised word will be ambiguous. For example, in the screen shown in FIG. 23, the word "uses" can either be a form of the verb "to use", or a plural noun. Where there is an ambiguity, the server 400 causes the display on the screen of the terminal 100 of the multiple entries from the lexical database 234 to which the word could relate, as shown in FIG. 24b, and the user selects one of the meanings. The selected meaning is signalled back to the server computer 200, and used instead of the text, in the record corresponding to the box displayed on the screen of FIG. 24a.

Thus, at the conclusion of step 2006, those boxes containing text which is recognised as corresponding to entities already stored at the server 200 are replaced by links to those entities at the server 200.

In step 2008, or on selection by the user of an appropriate control button displayed on the screen, the user is permitted to add new items to the lexical database 234 (or, conveniently, to a supplementary database of additional concepts). For example, in the screen shown in FIG. 22, the concepts "FreeFlow", "FreeFlow language", "FreeFlow client", "FreeFlow generator", "FreeFlow server", and "FreeFlow knowledge store" may be added.

In each case, the server computer 200 prompts the user via the terminal 100 to indicate whether the entry is an entity, a modifier or a state of affairs, and permits the user to follow, from the top, the hierarchy used by the lexical database 234 to link the new entity into the hierarchy defined thereby.

Additionally, pre-defined commonly used categories are preferably provided, such as "entity", "definitions", "document", "person", "product", and "organisation".

Having recording the new entry in the lexical database, the records previously containing text are replaced or augmented by a reference to that record in the same manner as described above.

Thus, at the end of this step, all boxes which are either recognised by the server 200 or designated by the user as corresponding to a particular concept are linked through pointers to and from the lexical record of that concept, so that all statements held within the server 200 about a given concept can be subsequently accessed.

Where the content of a box contains multiple words (for example "FreeFlow knowledge store"), the box may accordingly represent a particular instance (e.g. the FreeFlow knowledge store as an entity in its own right) of a more general class (for example "knowledge store" in general, or "store" in general). The present embodiment allows such concepts to be separately identified from the generic classes within which they lie.

At this stage, then, text information has been input in a fashion which allows the authors to group their thoughts logically and represent them graphically, and permits individual ideas or concepts to be identified with those already in the server 200, or to be newly stored therein for future use if they do not correspond to anything previously stored therein. This is useful in its own right, since it ensures that multiple statements about, for example, "FreeFlow" can all be accessed subsequently by searching the server 200 for the record of that concept and then following the links to each record thereof.

Moreover, the text of the statements can be regenerated from the records held in the server, by following the links recorded between the different records of each statement, in the order specified by the direction of the links, to reconstitute the original text. However, unlike the first embodiment, the regenerated text is not fully language independent, since some records may contain strings of text in the original source language.

Accordingly, in this embodiment, on selective actuation of a displayed button at the screen at the terminal 100 by the user, the analysis process described in the first embodiment is performed in step 2010, to parse the text held in the boxes for each statement, to attempt fully to analyse their meanings. Accordingly, for each box containing text which has not yet been fully replaced by a reference to a stored item, each word is analysed as described in the first embodiment, and the statements containing the word are parsed, and ambiguities are displayed for the user to resolve.

Conveniently, the original record for each box is retained, with the text it contains, for subsequent display if desired. However, by selecting the box (e.g. by "double clicking" using a mouse) the internal structure is displayed.

Figure 26A:
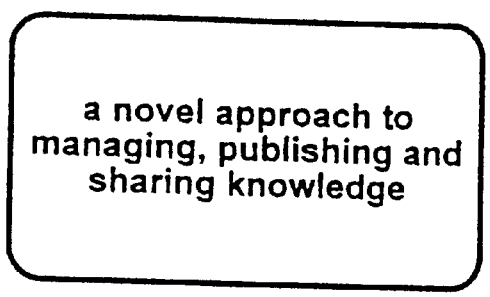
FIG. 26 (comprising FIG. 26a and FIG. 26b) shows the transformation of input text (corresponding to a portion of that shown in FIG. 22) to stored records according to the sixth embodiment of the invention.
Figure 26B:
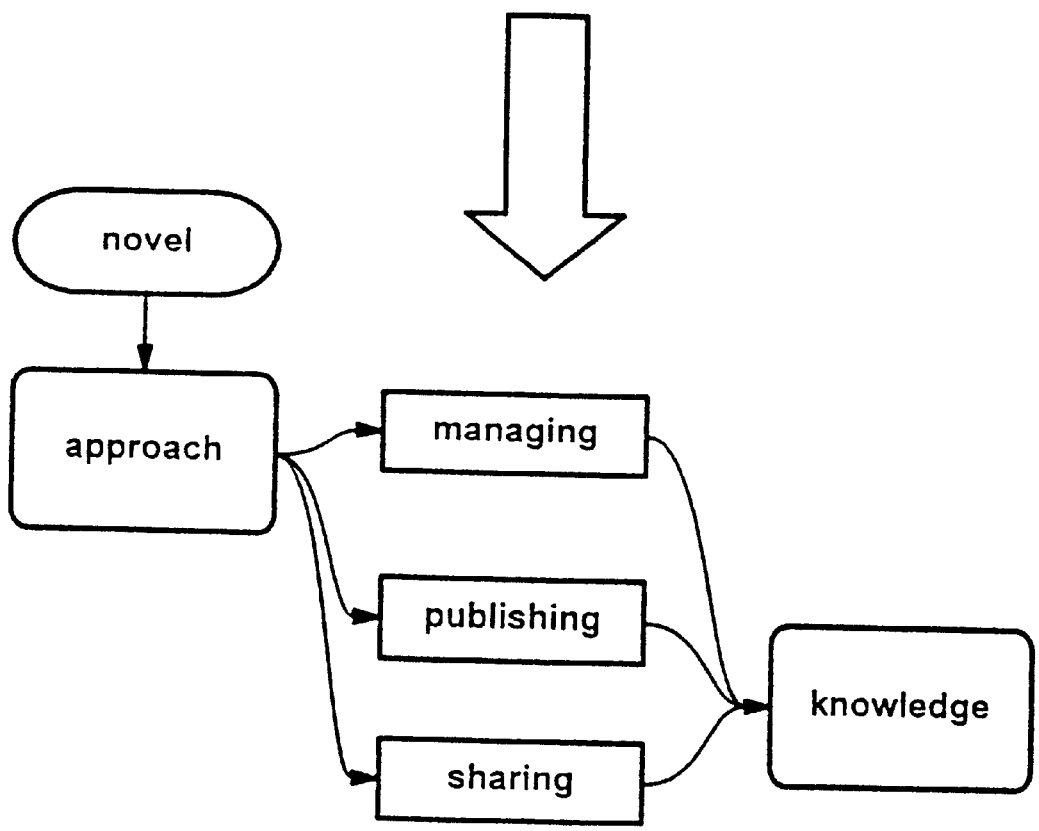

In the record for the box, a flag indicates that it is a composite containing several recognised concepts, and a pointer points to the newly created records, one for each of the recognised concepts. Thus, for example, the box shown containing the text "a novel approach to managing, publishing and sharing knowledge" is replaced with the structure shown in FIG. 26, in which each word is represented by a separate record.

As just described, any words which are not recognised as corresponding to those already in the lexical store or supplement thereto may be newly defined by the user.

Thus, in step 2012, new records for each recognised word are stored and amendments to existing records are made.

Figure 25:
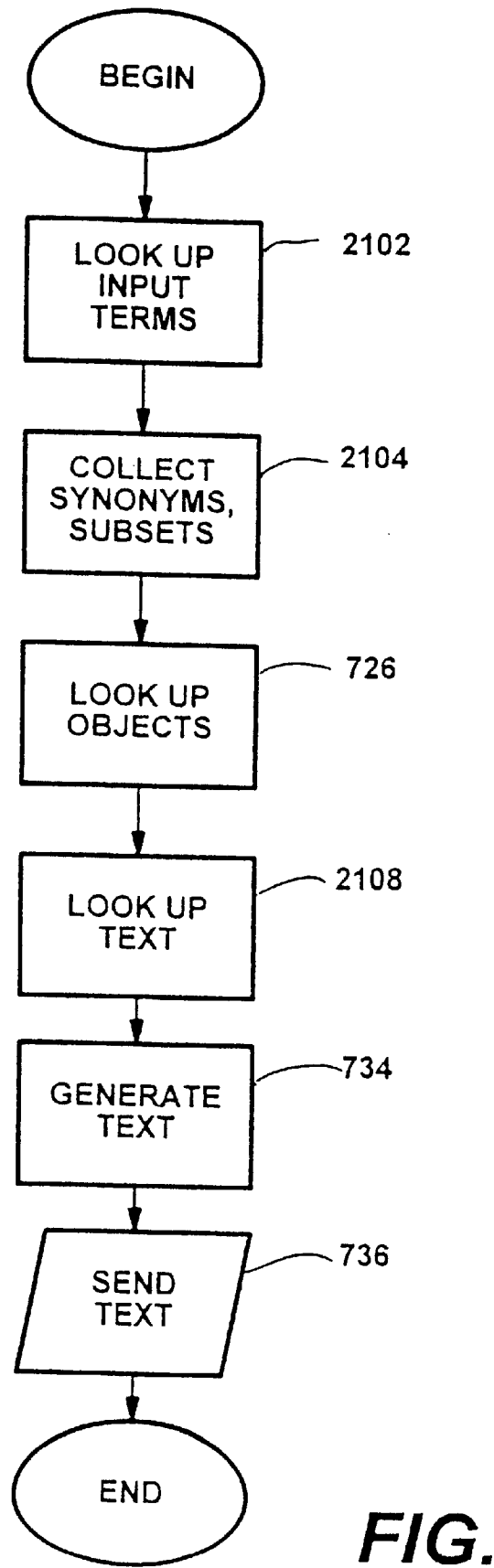
FIG. 25 is a flow diagram showing schematically the process of retrieving stored text which has been input by the process of FIG. 23.

Referring to FIG. 25, data is retrieved from the server 200 in similar fashion to that described in relation to the first embodiment. Typically, the user will interrogate the server 200 via a browser program on a terminal 100. One or more search terms will be entered in a form which is uploaded to the server 200.

In a step 2102, the terms are looked up in the lexical store, and in a step 2104 any hierarchically lower entries or synonyms for the same concept are also looked up. These steps correspond to step 724 in the earlier embodiments.

In a step 726 all records pointing to the entries concerned are accessed, as in the first embodiment.

In a step 2108, a text search is performed through the records of those objects which have not been fully replaced by references to the lexical database. Any records thus located which contain the input text are added to the list of objects located in step 726.

In step 724, as in the previous embodiment, the output text is generated corresponding to the statements containing the detected search terms, using the link data. Any text stored in records is directly reproduced.

In step 736, as in the first embodiment, the text is transmitted to the terminal 100.

Even where text has been retained in some records, it is still possible as in the first embodiment to make use of the links and any neighbouring records which have been recognised as corresponding to entries in the lexical database, to perform some reasoning and inference operations on the text held in the records.

In addition to, or as an alternative to, the generation of text directly, a graphical display corresponding to that of FIG. 22 may be reproduced, illustrating the structure of the retrieved statements graphically.

In this case, selecting any record using the mouse at the terminal 100 causes the display of further statements which point to the same lexical entry as does that record, to provide information retrieval in a manner similar to hypertext.

It will be seen that this embodiment combines the advantages of the earlier embodiments with the provision of an intermediate graphical form of input, which is convenient to authors while still allowing some parsing and inference of the input information.

Other Modifications and Embodiments

The consistency checking features of the above described fifth embodiment may, of course, be used with any of the preceding embodiments and, in general, unless the contrary is indicated, features of the above described embodiment may freely be combined.

The foregoing embodiments are merely examples of the invention and are not intended to be limiting, it being understood that many other alternatives and variants are possible within the scope of the invention. Protection is sought for any and all novel subject matter disclosed herein and combinations of such subject matter.

What is claimed is:

1. Apparatus for use in identifying semantic ambiguities, comprising (i) input means, including a text input means;
(ii) storage means;
(iii) processing means arranged to parse input text to
   a. identify semantically meaningful elements in the input text;
   b. derive relationships between the identified semantically meaningful elements; and
   c. store a group of the identified semantically meaningful elements, and data defining the derived relationships, in the storage means;
(iv) graphical display means, which, in response to said parsing of the input text, is arranged to generate a visual representation of said input text in which the identified semantically meaningful elements are represented by pictorial elements and the derived relationships therebetween are represented by linking elements interconnecting the pictorial elements.

2. Apparatus as in claim 1 wherein:
said input means further comprises a graphical input means arranged to interact with said visual representation to allow editing of said semantically meaningful elements identified from the input text, and
said graphical display means is arranged correspondingly to update said visual representation.

3. Apparatus as in claim 1 wherein said storage means comprises a lexical store storing an entry for each possible said semantically meaningful element.

4. Apparatus as in claim 3 wherein each said entry includes meaning data relating to the meaning of the corresponding element.

5. Apparatus as in claim 4 wherein said processing means is arranged to analyse at least one said group in accordance with the meaning data stored for the corresponding entries in the lexical store.

6. Apparatus as in claim 5 wherein said processing means is arranged to locate inconsistencies between different elements in said at least one group.

7. Apparatus for generation of a computer program from a natural language source document specification of the function thereto, said apparatus comprising:
   input means as in claim 6, arranged to input part or all of said source document specification, and to test said input for semantic ambiguity, and
   a code generator means for generating code when no further ambiguity is detected, for analyzing said source document specification for inconsistency, and for generating code when no further inconsistency is detected.

8. Apparatus as in claim 3 wherein said lexical store is arranged to store an indication of the level of familiarity of the corresponding semantically meaningful element to users.

9. Apparatus as in claim 3, arranged to receive source documents in a plurality of languages, in which said possible semantically meaningful element is a word and wherein corresponding words share a common entry in said lexical store.

10. Apparatus as in claim 1 wherein said storage means is arranged to store, for said semantically meaningful elements identified from the input text, timestamp data indicating the time of origin of said semantically meaningful elements identified from the input text.

11. Apparatus as in claim 1 wherein said storage means is arranged to store, for semantically meaningful elements within said text, access level information.

12. Apparatus as in claim 1 wherein said storage means is arranged to store data representing a source document of said text, in addition to said semantically meaningful elements identified from the input text relating to said text.

13. Apparatus as in claim 1 wherein:
said text includes, or refers to, document components in media other than that of said document, and
said storage means is arranged to store said document components or references thereto, with said semantically meaningful elements identified from the input text.

14. Apparatus as in claim 1 wherein said input means comprises a speech recogniser.

15. Apparatus as in claim 1 wherein said input means comprises a keyboard.

16. Apparatus for data retrieval of semantically meaningful elements identified from the input text which has been input by apparatus as in claim 1, said apparatus for data retrieval, comprising:
   additional storage means storing said semantically meaningful elements identified from the input text;
   query input means for inputting search parameters;
   processing means for retrieving one or more of said at least one group.

17. Apparatus as in claim 16, further comprising generating means for generating an output document from said one or more group.

18. Apparatus as in claim 17, further comprising output means for outputting said output document.

19. Apparatus as in claim 17 wherein said generating means is arranged to generate said output document in at least one language different to the language in which the text was input.

20. Apparatus as in claim 18 wherein said output means comprises a text display terminal.

21. Apparatus as in claim 18 wherein said output means comprises a speech synthesiser.

22. Apparatus as in claim 18 wherein said output means comprises an animated display generator.

23. Apparatus as in claim 22 wherein said animated display generator generates a sign language display.

24. Apparatus as in claim 22 wherein said animated display generator generates a representation of a speaking human face.

25. Apparatus as in claim 16 for retrieving semantically meaningful elements identified from the input text stored by an apparatus for use in identifying semantic ambiguities, comprising
   (i) input means, including a text input means;
   (ii) storage means;
   (iii) processing means arranged to parse input text to
      a. identify semantically meaningful elements in the input text;
      b. derive relationships between the identified semantically meaningful elements; and
      c. storage a group of the identified semantically meaningful elements, and data defining the derived relationships, in the storage means; and
   (iv) graphical display means, which, in response to said parsing of the input text, is arranged to generate a visual representation of said input text in which the identified semantically meaningful elements are represented by pictorial elements and the derived relationships therebetween are represented by linking elements interconnecting the pictorial elements;
   wherein said processing means is arranged to receive search parameters defining plural search criteria, and to analyse said relationships in dependence upon said criteria, and to output groups which meet said criteria in dependence upon said analysis.

26. Apparatus as in claim 16 for retrieving semantically meaningful elements identified from the input text stored by apparatus wherein:
- said storage means comprises a lexical store storing an entry for each possible said semantically meaningful element;
- each said entry includes meaning data relating to the meaning of said element, and
- said processing means is arranged to analyse said at least one group in accordance with the meaning data stored for the corresponding entries in the lexical store, and to select at least one group for output in dependence thereupon.

27. Apparatus as in claim 16, for retrieving semantically meaningful elements identified from the input text stored by apparatus wherein:
- said storage means comprises a lexical store storing an entry for each possible said semantically meaningful element;
- said lexical store being arranged to store an indication of the level of familiarity of the corresponding semantically meaningful element to users; and
- said processing means being arranged to select at least one group for output in dependence upon said familiarity data.

28. Apparatus as in claim 16, for retrieving semantically meaningful elements identified from the input text stored by apparatus wherein:
- said storage means is arranged to store, for semantically meaningful elements within said input text, access level information; and
- said processing means being arranged to select semantically meaningful elements for output in accordance with said access level information.

29. Apparatus as in claim 28 further comprising generator means for generating an output document from said at least one group wherein:
- said processing means is arranged selectively to suppress output of selected said select semantically meaningful elements within said at least one group in accordance with said access level information, and
- said generator means is arranged to generate a document from the remainder of the content of said at least one group.

30. Apparatus for generation of a computer program from a natural language source document specification of the function thereof, said apparatus comprising:
- input means as in claim 1, arranged to input part or all of said source document specification, and to test said input for semantic ambiguity, and
- a code generator means for generating code when no further ambiguity is detected.

31. Apparatus as in claim 1, in which said storage means is arranged to store data representing the author of said text.

32. Apparatus according to claim 1 wherein the processing means is operable to store one or more further groups of data representing alternative relationships between the identified semantically meaningful elements.

33. Apparatus according to claim 1 wherein the input means further includes query input means for inputting search parameters, which query input means is in operative association with the processing means, and is arranged to pass the search parameters to the processing means for parsing thereof, whereupon the processing means identifies semantically meaningful elements, and relationships therebetween, from the search parameters, the apparatus further comprising retrieving means for retrieving data from the said storage means in accordance with the parsed search parameters.

34. Apparatus for use in identifying semantic ambiguities, said apparatus comprising:
- (i) input means including a text input means;
- (ii) storage means;
- (iii) processing means arranged to parse input text to
  a. identify semantically meaningful elements in the input text;
  b. derive relationships between the identified semantically meaningful elements;
  c. store a group of the identified semantically meaningful elements, and data defining the derived relationships, in the storage means;
  d. store access level information associated with the semantically meaningful elements in the group; and
- graphical display means, which, in response to said parsing of the input text, is arranged to generate a visual representation of said input text in which the identified semantically meaningful elements are represented by pictorial elements and
- the derived relationships therebetween are represented by linking elements interconnecting the pictorial elements.

35. Apparatus as in claim 34 wherein said storage comprises a lexical store storing an entry for each possible said semantically meaningful entry.

36. Apparatus as in claim 35 wherein each said entry includes meaning data relating to the meaning of said entity.

37. Apparatus as in claim 36 wherein said processor is arranged to analyze said semantically meaningful elements in accordance with the meaning data stored for the corresponding entries in the lexical store.

38. Apparatus as in claim 37 wherein said processor is arranged to locate inconsistencies between different said semantically meaningful elements.

39. Apparatus as in claim 35 wherein said lexical store is arranged to store an indication of the level of familiarity of the corresponding semantically meaningful element to users.

40. Apparatus as in claim 35, arranged to receive source documents in a plurality of languages, in which corresponding words share a common entry in said lexical store.

41. Apparatus as in claim 34 wherein said storage is arranged to store, for said content data, timestamp data indicating the time of origin of said semantically meaningful elements identified from the input text.

* * * * *